(12) United States Patent
Seo et al.

(10) Patent No.: US 9,334,002 B2
(45) Date of Patent: May 10, 2016

(54) BALANCE CONTROL APPARATUS OF ROBOT AND CONTROL METHOD THEREOF

(75) Inventors: Kee Hong Seo, Seoul (KR); Joo Hyung Kim, Seongnam-si (KR); Kyung Shik Roh, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 695 days.

(21) Appl. No.: 13/490,951

(22) Filed: Jun. 7, 2012

(65) Prior Publication Data

US 2012/0316683 A1 Dec. 13, 2012

(30) Foreign Application Priority Data

Jun. 10, 2011 (KR) .................... 10-2011-0055954
May 21, 2012 (KR) .................... 10-2012-0053489

(51) Int. Cl.
*G05B 19/04* (2006.01)
*B62D 57/032* (2006.01)

(52) U.S. Cl.
CPC .................................. *B62D 57/032* (2013.01)

(58) Field of Classification Search
CPC ....... B62D 57/00; B62D 57/02; B62D 57/032
See application file for complete search history.

(56) References Cited

U.S. PATENT DOCUMENTS

| 5,355,064 | A  | * | 10/1994 | Yoshino et al. | ........... 318/568.12 |
| 2004/0036437 | A1 | * | 2/2004 | Ito | ............................. 318/568.12 |
| 2004/0044440 | A1 | * | 3/2004 | Takenaka | ....................... 700/245 |
| 2005/0240307 | A1 | * | 10/2005 | Kuroki et al. | ................. 700/245 |
| 2009/0306821 | A1 | * | 12/2009 | Park et al. | ..................... 700/245 |
| 2011/0213496 | A1 | * | 9/2011 | Orita | ............................. 700/254 |

OTHER PUBLICATIONS

U.S. Appl. No. 13/369,438, filed Feb. 9, 2012, Kee Hong Seo et al., Samsung Electronics Co., Ltd.

* cited by examiner

*Primary Examiner* — Behrang Badii
*Assistant Examiner* — Adam Mott
(74) *Attorney, Agent, or Firm* — Harness, Dickey & Pierce, P.L.C.

(57) ABSTRACT

A balance control apparatus of a robot and a control method thereof. The balance control method of the robot, which has a plurality of legs and an upper body, includes detecting pose angles of the upper body and angles of the plurality of joint units, acquiring a current capture point and a current hip height based on the pose angles and the angles of the plurality of joint units, calculating a capture point error by comparing the current capture point with a target capture point, calculating a hip height error by comparing the current hip height with a target hip height, calculating compensation forces based on the capture point error and the hip height error, calculating a target torque based on the calculated compensation forces, and outputting the calculated target torque to the plurality of joint units to control balance of the robot.

39 Claims, 10 Drawing Sheets

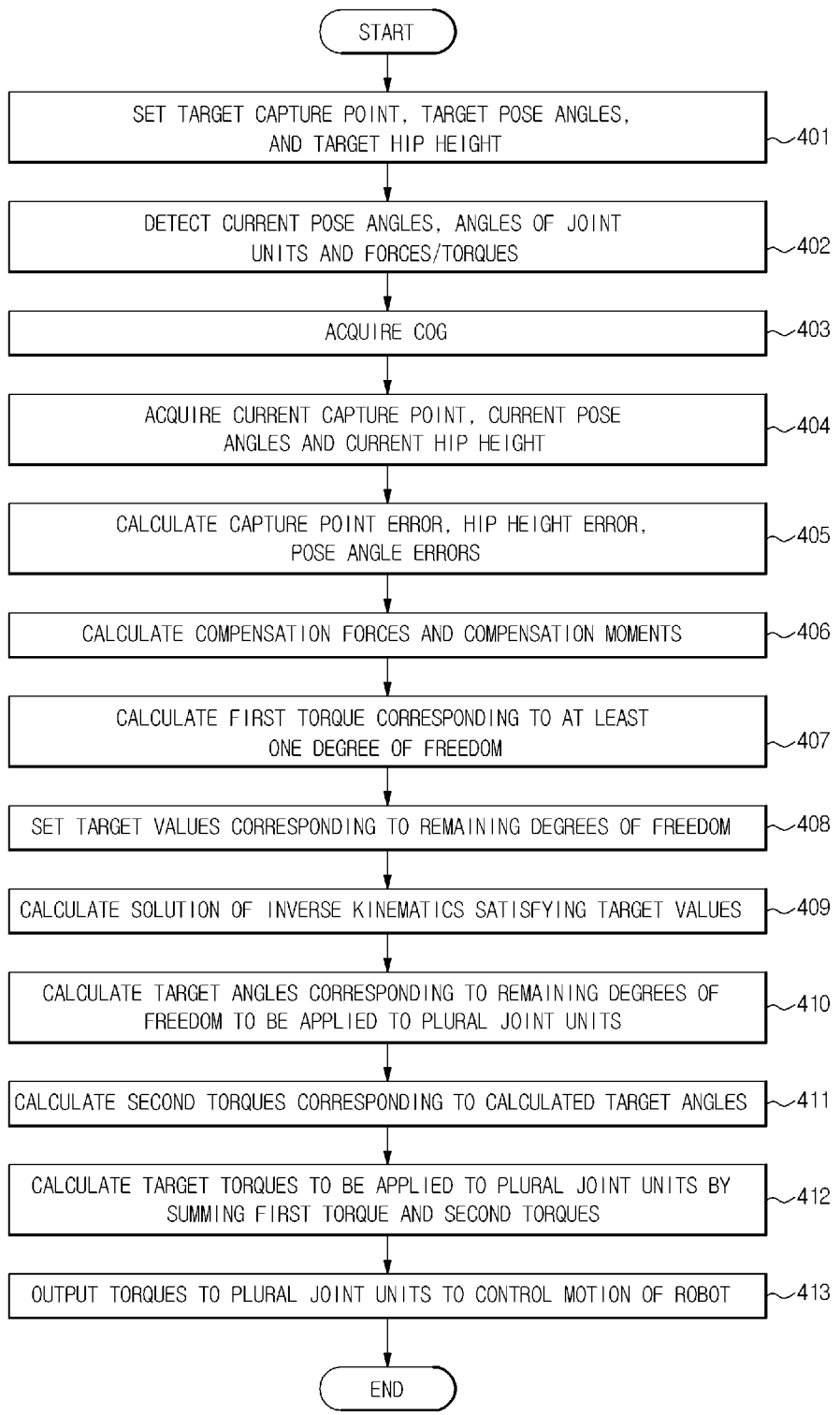

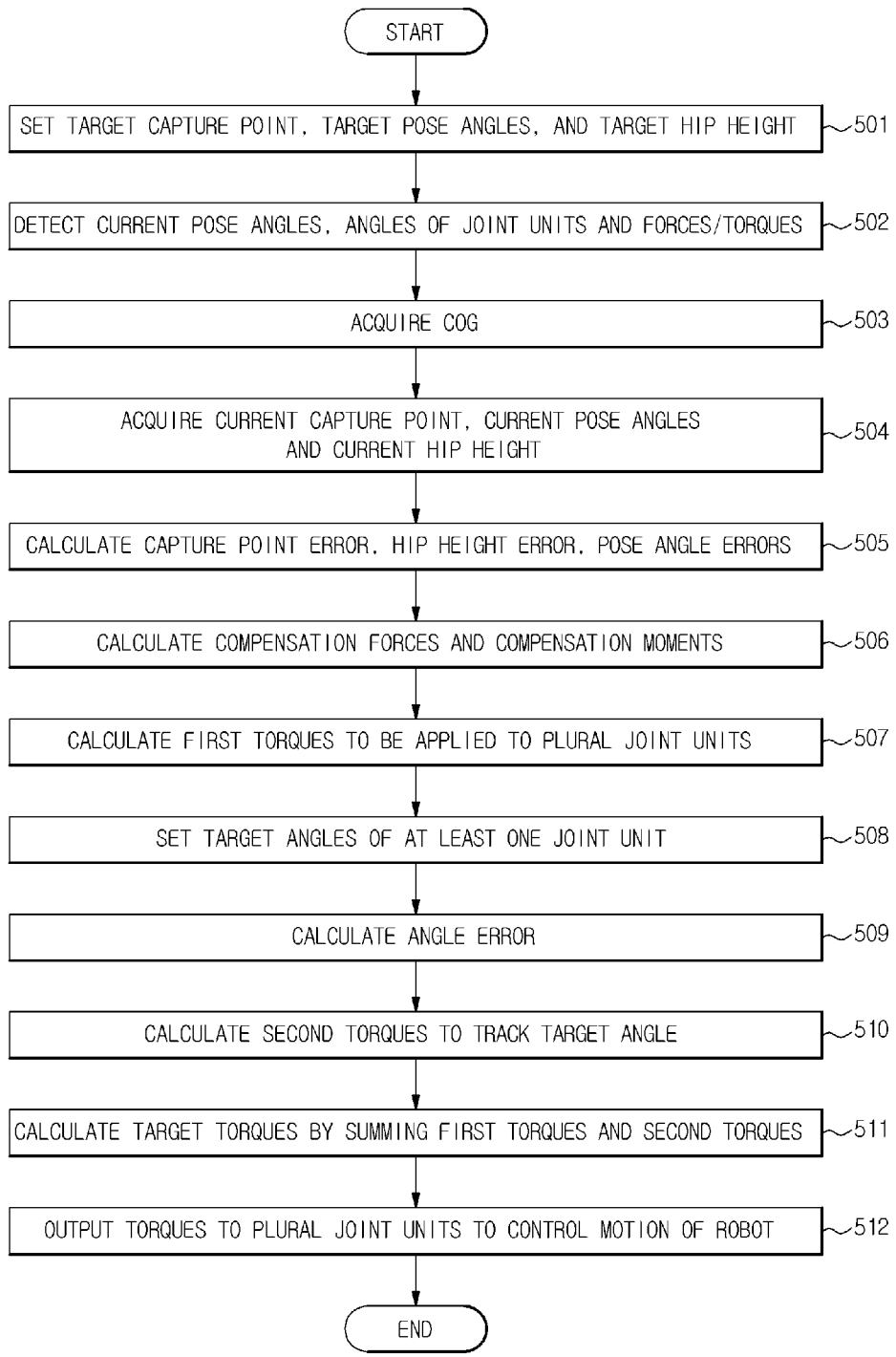

BALANCE CONTROL APPARATUS OF ROBOT AND CONTROL METHOD THEREOF

CROSS-REFERENCE TO RELATED APPLICATIONS

This application claims the priority benefit of Korean Patent Application No. 10-2011-0055954, filed on Jun. 10, 2011 and Korean Patent Application No. 10-2012-0053489, filed on May 21, 2012, in the Korean Intellectual Property Office, the disclosures of each of which is incorporated herein by reference.

BACKGROUND

1. Field

Example embodiments of the following disclosure relate to a balance control apparatus of a robot which controls driving of joint units provided on a plurality of legs to keep the balance of the robot, and a control method thereof.

2. Description of the Related Art

In general, robots have a joint system similar to humans and perform motions similar to those of human hands and feet using such a joint system.

Industrial robots for automation and unmanned operation of production in factories were developed at the initial stage, however, service robots to provide various services to humans have been vigorously developed recently.

These service robots provide services to humans while walking in a manner similar to the way humans walk. Therefore, development and research into robots walking while maintaining a stable pose have been actively progressing.

As methods to control the walking of robots, there is a position-based Zero Moment Point (hereinafter, referred to as ZMP) control method, in which target positions of robot joints are tracked. In addition, there are a torque-based dynamic walking control method and a Finite State Machine (hereinafter, referred to as FSM) control method, in which target torques of robot joints are tracked.

The position-based ZMP control method achieves precise position control, but requires precise angle control of respective joints of a robot, and thus, requires high servo gain. As such, the ZMP control method requires high current, and thus, has low energy efficiency and high stiffness of the joints and may apply high impact during collusion with surrounding environments.

Further, in order to calculate angles of the respective joints through inverse kinematics from a given center of gravity (COG) and the walking patterns of the legs, the ZMP control method needs to avoid kinematic singularities, thus causing the robot to bend knees at any time during walking and to have an unnatural gait, which is different from that of a human.

Further, when inverse kinematics is used, position control of joints is needed. Here, in order to perform a desired motion, high gain is used, thus causing the joints not to flexibly cope with a temporary disturbance.

The torque-based dynamic walking control method needs to solve a dynamic equation to achieve the stable walking of a robot. However, if a robot having legs with 6 degrees of freedom moving in a random direction in a space is used, the dynamic equation becomes excessively complicated. Therefore, the dynamic equation has been applied to robots having legs with 4 degrees of freedom or less.

The FSM control method achieves control through torque commands and is applicable to an elastic mechanism, and thus, has high energy efficiency and low stiffness of joints, thereby being safe in surrounding environments. However, the FSM control method does not achieve precise position control, and thus, it is not easy to perform a precise whole body motion, such as ascending a stairway or avoiding an obstacle.

SUMMARY

Therefore, it is an aspect of an example embodiment to provide a balance control apparatus of a robot which maintains a balanced upright pose by compensating for forces in the horizontal direction and the vertical direction based on a capture point and a hip height, and a control method thereof.

It is another aspect of an example embodiment to provide a balance control apparatus of a robot which maintains a balanced pose by compensating for moments based on pose angles, and a control method thereof.

It is a further aspect of an example embodiment to provide a balance control apparatus of a robot which maintains a balanced pose by distributing a compensation force applied to a plurality of legs, and a control method thereof.

Additional aspects of embodiments will be set forth in part in the description which follows and, in part, will be obvious from the description, or may be learned by practice of embodiments.

In accordance with one aspect of an embodiment, a balance control method of a robot with a plurality of degrees of freedom of translating motion and degrees of freedom of rotating motion, which has a plurality of legs, each leg having a plurality of joint units, and an upper body connected to the plurality of legs, includes detecting pose angles of the upper body and angles of the plurality of joint units, acquiring a current pose based on the pose angles and the angles of the plurality of joint units, calculating a pose error corresponding to at least one degree of freedom of translating motion from among the plurality of degrees of freedom of translating motion based on the current pose and a predetermined target pose, calculating compensation forces corresponding to the at least one degree of freedom of translating motion based on the pose error, respectively calculating target torques of the plurality of joint units corresponding to the at least one degree of freedom of translating motion based on the compensation forces corresponding to the at least one degree of freedom of translating motion, and outputting the target torques corresponding to the at least one degree of freedom of translating motion to the plurality of joint units to control balance of the robot.

Calculation of the target torques may include calculating target torque sums by adding the target torques corresponding to the at least one degree of freedom of translating motion to target torques corresponding to the remaining degrees of freedom of translating motion.

Calculation of the pose error may include detecting the position of a current center of gravity (COG) based on the detected pose angles and angles of the plurality of joint units, the COG corresponding to the at least one degree of freedom of translating motion, calculating a COG error corresponding to the at least one degree of freedom of translating motion by comparing the current COG with a predetermined target COG, and using the COG error as the pose error.

Calculation of the pose error may include detecting the position and velocity of a current COG based on the detected pose angles and angles of the plurality of joint units, the COG corresponding to the at least one degree of freedom of translating motion, acquiring a current capture point corresponding to the at least one degree of freedom of translating motion based on the detected position and velocity of the current COG, calculating a capture point error corresponding to the at least one degree of freedom of translating motion by comparing the current capture point with a predetermined target capture point, and using the capture point error as the pose error.

Calculation of the pose error may include calculating the position of any one current reference point of the hip or the upper body of the robot corresponding to the at least one degree of freedom of translating motion based on the detected pose angles and angles of the plurality of joint units, calculating a reference point position error corresponding to the at least one degree of freedom of translating motion by comparing the position of the current reference point with the position of a predetermined target reference point, and using the reference point position error as the pose error.

Calculation of the pose error corresponding to the at least one degree of freedom of translating motion may be different from calculation of pose errors corresponding to the remaining degrees of freedom of translating motion.

Calculation of the compensation forces may include acquiring a current capture point and a current hip height, calculating a capture point error by comparing the current capture point with a predetermined target capture point, calculating a hip height error by comparing the current hip height with a predetermined target hip height, and calculating the compensation forces based on the capture point error and the hip height error.

Acquisition of the current capture point may include acquiring the position and velocity of a COG based on the pose angles of the upper body and the angles of the plurality of joint units, and acquiring the current capture point based on the acquired position and velocity of the COG.

Acquisition of the current hip height may include calculating the current hip height based on a COG and the angles of the plurality of joint units.

Calculation of the compensation forces may include calculating compensation forces in the horizontal direction using the capture point error, and calculating compensation force in the vertical direction using the hip height error.

The balance control method may further include judging a current pose based on the pose angles of the upper body and the angles of the plurality of joint units, and setting the target capture point and the target hip height based on the current pose and motion data stored in advance.

Calculation of the target torques may include calculating distance rates between a point of a COG of the robot projected onto a ground surface and feet respectively connected to the plurality of legs, distributing the calculated compensation forces so that the calculated calculation forces are applied to the plurality of legs based on the calculated distance rates, and calculating target torques to be applied to the plurality of joint units based on the distributed compensation forces.

Acquisition of the capture point may be carried out using forward kinematics.

The balance control method may further include calculating pose angle errors by comparing the pose angles of the upper body with predetermined target pose angles, calculating compensation moments based on the calculated pose angle errors, and reflecting the compensation moments in calculation of the target torques.

Reflection of the compensation moments in calculation of the target torques may include converting the compensation moments into torques of the plurality of joint units using Jacobian, and summing the converted torques and the target torques in calculation of the target torques.

Calculation of the compensation moments may include calculating compensation moments in the yaw, roll and pitch directions using the calculated pose angle errors.

Detection of the pose angles may include detecting at least one of a yaw angle, a roll angle and a pitch angle of the upper body.

Calculation of the target torques may include calculating virtual acceleration of gravity based on the compensation forces, the mass of the robot and acceleration of gravity, calculating virtual gravity compensation torque corresponding to the at least one degree of freedom based on the virtual acceleration of gravity, and calculating the target torques based on the virtual gravity compensation torque.

The balance control method may further include setting positions and angles corresponding to the remaining degrees of freedom from among the plurality of degrees of freedom, calculating a solution of inverse kinematics satisfying the set positions and angles, calculating target angles of the plurality of joint units corresponding to the remaining degrees of freedom of the plurality of joint units based on the solution of inverse kinematics, and calculating torques of the plurality of joint units corresponding to the remaining degrees of freedom based on the target angles of the plurality of joint units corresponding to the remaining degrees of freedom.

Calculation of the target torques may include calculating the target torques by summing the torques corresponding to the at least one degree of freedom and the torques corresponding to the remaining degrees of freedom.

The balance control method may further include inputting a target angle of at least one joint unit from among the plurality of joint units, calculating a torque to track the input target angle of the at least one joint unit, and reflecting the torque for the target angle of the at least one joint unit in calculation of the target torques.

Input of the target angle may include inputting target angles of a plurality of joints, if each of the plurality of joint units includes the plurality of joints corresponding to plurality of degrees of freedom.

Calculation of the target torques may include calculating the target torques using Jacobian.

Calculation of the target torques may include calculating virtual acceleration of gravity based on the compensation forces, the mass of the robot and acceleration of gravity, calculating virtual gravity compensation torque corresponding to the at least one degree of freedom based on the virtual acceleration of gravity, and calculating target torques of the plurality of joint units corresponding to the at least one degree of freedom using the calculated virtual gravity compensation torque and Jacobian.

In accordance with another aspect of an embodiment, a balance control apparatus of a robot with a plurality of degrees of freedom, which has a plurality of legs, each leg having a plurality of joint units, and an upper body connected to the plurality of legs, includes a pose detection unit to detect pose angles of the upper body, an angle detection unit to detect angles of the plurality of joint units, a setup unit to set a target pose corresponding to at least one degree of freedom from among the plurality of degrees of freedom based on motion data stored in advance, a balance controller to acquire a current pose corresponding to the at least one degree of freedom based on the pose angles and the angles of the plurality of joint units, to calculate a pose error by comparing the current pose with a target pose, to calculate compensation forces corresponding to the at least one degree of freedom based on the pose error, and to calculate target torques corresponding to the at least one degree based on the compensation forces, and a servo controller to output the target torques corresponding to the at least one degree of freedom to the plurality of joint units.

The balance controller may include an acquisition unit to acquire a COG based on the pose angles of the upper body and the angles of the plurality of joint units and to acquire the current pose based on the COG.

The balance controller may include an acquisition unit to acquire the position and velocity of a COG based on the pose angles of the upper body and the angles of the plurality of joint units and to acquire the current pose by acquiring a current capture point based on the position and velocity of the COG.

The balance controller may include an acquisition unit to acquire the position of a current reference point of the hip or the upper body of the robot based on the pose angles of the upper body and the angles of the plurality of joint units and to acquire the current pose based on the position of the reference point.

The balance controller may acquire a current capture point and a current hip height based on the pose angles and the angles of the plurality of joint units, calculate a capture point error by comparing the current capture point with a predetermined target capture point, calculate a hip height error by comparing the current hip height with a predetermined target hip height, calculate compensation forces based on the capture point error and the hip height error, and calculate target torques corresponding to the at least one degree of freedom from among the plurality of degrees of freedom based on the compensation forces.

The setup unit may set a target COG corresponding to the at least one degree of freedom and set the target pose using the target COG.

The setup unit may set a target capture point corresponding to the at least one degree of freedom and set the target pose using the target capture point.

The setup unit may set a target position of a reference point of the hip or the upper body of the robot corresponding to the at least one degree of freedom and set the target pose based on the target position of the reference point.

The balance controller may include an acquisition unit to acquire a COG of the robot and a hip height based on the pose angles of the upper body and the angles of the plurality of joint units and to acquire a current capture point based on the acquired COG.

The balance controller may calculate compensation forces in the horizontal direction using the capture point error, and calculate compensation force in the vertical direction using the hip height error.

The balance control apparatus may further include a force/torque detection unit to detect loads respectively applied to feet provided on the plurality of legs, and the setup unit may judge the current pose based on the detected loads respectively applied to the feet and set the target capture point and the target hip height based on the current pose and the motion data stored in advance.

The balance control apparatus may further include a distribution unit to calculate distance rates between a point of a COG of the robot projected onto a ground surface and feet connected to the plurality of legs and to distribute the calculated compensation forces so that the calculated compensation forces are applied to the plurality of legs based on the calculated distance rates, and the balance controller may calculate torques to be applied to the plurality of joint units based on the compensation forces distributed to the plurality of legs.

The balance controller may calculate pose angle errors by comparing the pose angles of the upper body with predetermined target pose angles, calculate compensation moments based on the calculated pose angle errors, and reflect the calculated compensation moments in calculation of the torques.

The balance controller may calculate compensation moments in the yaw, roll and pitch directions using the calculated pose angle errors.

The setup unit may set one point on a line, passing through the inside of support region formed by feet of the plurality of legs in the direction of gravity, as the target capture point.

The balance control apparatus may further include an input unit to receive motion data including at least one pose from a user, and the setup unit may store the received motion data.

The balance controller may calculate virtual acceleration of gravity based on the compensation forces, the mass of the robot stored in advance and acceleration of gravity, calculate virtual gravity compensation torques corresponding to the at least one degree of freedom based on the virtual acceleration of gravity, and calculate the target torques based on the virtual gravity compensation torques.

The balance controller may calculate torques corresponding to the remaining degrees of freedom from among the plurality of degrees of freedom using inverse kinematics.

The balance controller, when a target angle of at least one joint unit from among the plurality of joint units is input, may calculate a torque corresponding to the input target angle, and reflect the torque corresponding to the target angle of the at least one joint unit in calculation of the target torques.

The balance controller may calculate the target torques using Jacobian.

BRIEF DESCRIPTION OF THE DRAWINGS

These and/or other aspects of embodiments will become apparent and more readily appreciated from the following description of the embodiments, taken in conjunction with the accompanying drawings of which:

FIG. 10 is a flowchart illustrating a balance control method of the robot in accordance with another example embodiment; and FIG. 11 is a flowchart illustrating a balance control method of a robot in accordance with yet another example embodiment.

DETAILED DESCRIPTION

Figure 1:
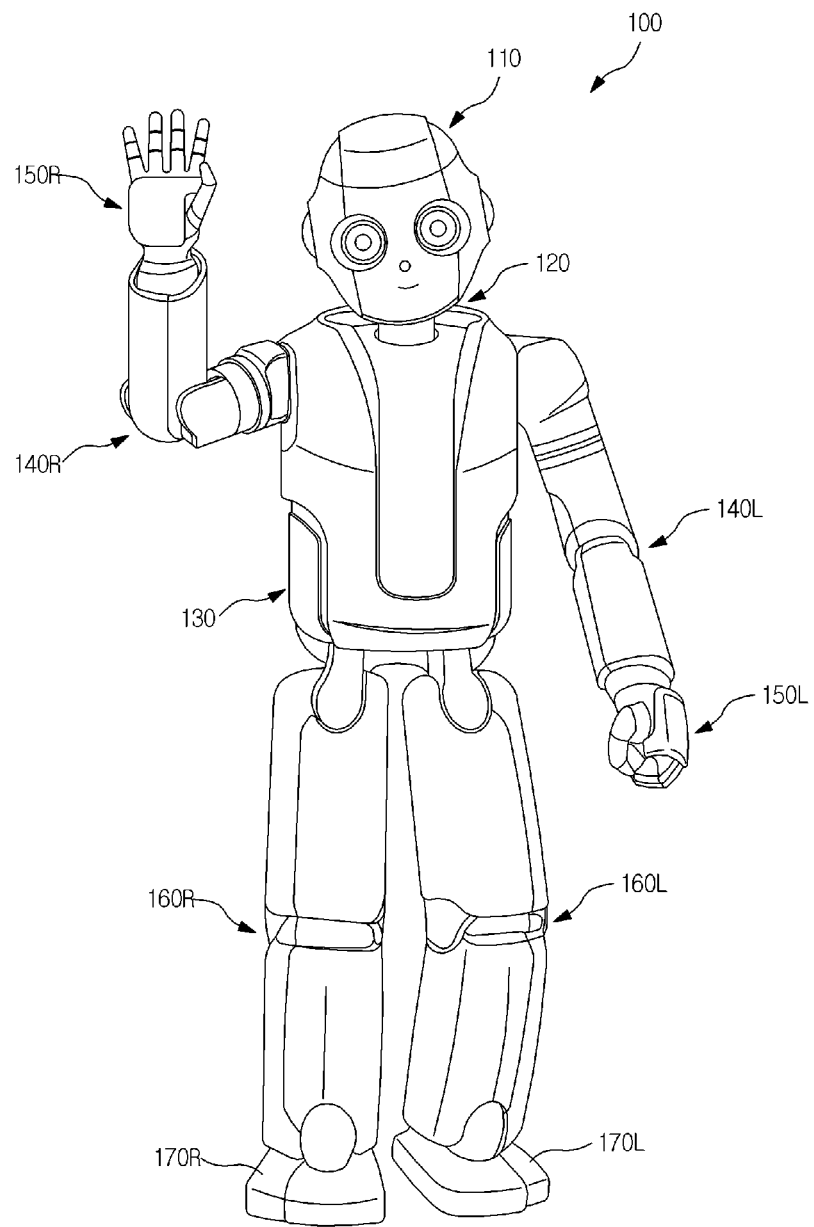
FIG. 1 is a view illustrating an external appearance of a robot in accordance with an example embodiment.

Reference will now be made in detail to embodiments, examples of which are illustrated in the accompanying drawings, wherein like reference numerals refer to like elements throughout.

Figure 2:
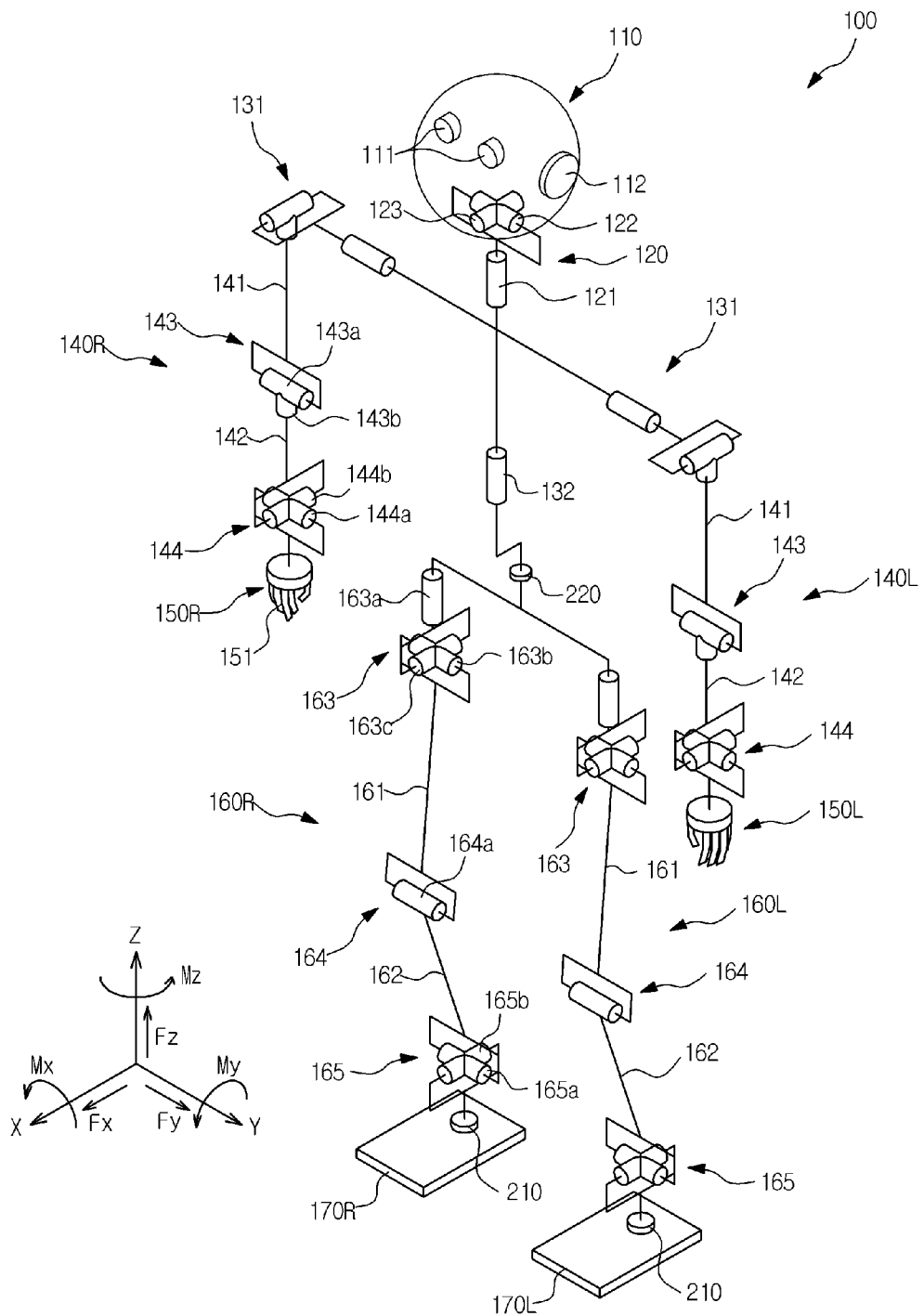
FIG. 2 is a view illustrating joint structures of the robot in accordance with an example embodiment.

FIG. 1 is a view illustrating an external appearance of a robot in accordance with an example embodiment, and FIG. 2 is a view illustrating joint structures of the robot in accordance with an example embodiment.

As shown in FIG. 1, a robot 100 includes an upper body including a head 110, a neck 120, a torso 130, arms 140R and 140L and hands 150R and 150L, and a lower body including a plurality of legs 160R and 160L and feet 170R and 170L.

In more detail, the upper body of the robot 100 includes the head 110, the torso 130 connected to the lower portion of the head 110 through the neck 120, the two arms 140R and 140L connected to both sides of the upper portion of the torso 130, and the hands 150R and 150L respectively connected to tips of the two arms 140R and 140L.

The lower body of the robot 100 includes the two legs 160R and 160L connected to both sides of the lower portion of the torso 130 of the upper body, and the feet 170R and 170L respectively connected to tips of the two legs 160R and 160L.

Here, the head 110, the two arms 140R and 140L, the two hands 150R and 150L, the two legs 160R and 160L, and the two feet 170R and 170L, respectively, have designated degrees of freedom of translating motion and designated degrees of freedom of rotating motion through joints.

The upper body and the lower body of the robot 100 are protected by covers.

Here, "R" and "L" respectively indicate the right and left sides of the robot 100.

Hereinafter, the joints of the robot 100 will be described in detail with reference to FIG. 2.

Cameras 111 to capture surrounding images and microphones 112 to detect user voice are installed on the head 110 of the robot 100.

The neck 120 connects the head 110 and the torso 130 to each other. The neck 120 includes a neck joint unit.

The neck joint unit includes a rotary joint 121 in the yaw direction (rotated around the z-axis), a rotary joint 122 in the pitch direction (rotated around the y-axis), and a rotary joint 123 in the roll direction (rotated around the x-axis), and thus, has 3 degrees of freedom. The rotary joints 121, 122, and 123 of the neck joint unit are respectively connected to motors (not shown) to rotate the head 110.

Shoulder joint units 131 to connect the two arms 140R and 140L to the torso 130 are provided at both sides of the torso 130, and a rotary joint unit 132 in the yaw direction to rotate the breast relative to the waist is provided between the breast and the waist.

The two arms 140R and 140L respectively include upper arm links 141, lower arm links 142, elbow joint units 143 and wrist joint units 144.

The upper arm links 141 are connected to the torso 130 through the shoulder joint units 131, the upper arm links 141 and the lower arm links 142 are connected to each other through the elbow joint units 143, and the lower arm links 142 and the hands 150R and 150L are connected to each other by the wrist joint units 144.

Each elbow joint unit 143 includes a rotary joint 143a in the pitch direction and a rotary joint 143b in the yaw direction, and thus has 2 degrees of freedom. Each wrist joint unit 144 includes a rotary joint 144a in the pitch direction and a rotary joint 144b in the roll direction, and thus has 2 degrees of freedom.

Each hand 150R or 150L is provided with five fingers 151. A plurality of joints (not shown) driven by motors may be provided on the respective fingers 151. The fingers 151 perform various motions, such as gripping an article or pointing in a specific direction, in connection with movement of the arms 140R and 140L.

The two legs 160R and 160L of the robot 100 respectively include thigh links 161, calf links 162, hip joint units 163, knee joint units 164 and ankle joint units 165.

The thigh links 161 are connected to the torso 130 through the hip joint units 163, the thigh links 161 and the calf links 162 are connected to each other by the knee joint units 164, and the calf links 162 and the feet 170R and 170L are connected to each other by the ankle joint units 165.

Each hip joint unit 163 includes a rotary joint 163a in the yaw direction (rotated around the z-axis), a rotary joint 163b in the pitch direction (rotated around the y-axis), and a rotary joint 163c in the roll direction (rotated around the x-axis), and thus has 3 degrees of freedom.

Further, the position of the hip joint units 163 of the two legs 160R and 160L corresponds to the position of the hip.

Each knee joint unit 164 includes a rotary joint 164a in the pitch direction, and thus, has 1 degree of freedom. Each ankle joint unit 165 includes a rotary joint 165a in the pitch direction and a rotary joint 165b in the roll direction, and thus, has 2 degrees of freedom.

Since six rotary joints of the three joint units 163, 164, and 165 are provided on each of the two legs 160R and 160L, a total of twelve rotary joints is provided to the two legs 160R and 160L.

Actuators, such as motors (not shown), are provided on the respective joints of the robot 100. Thereby, the respective joints perform proper rotation through rotation of the motors, thus implementing various motions.

Thereby, when the robot 100 walks, the robot 100 may achieve stable and natural walking while keeping balance. This will be described in detail with reference to FIG. 3.

Figure 3:
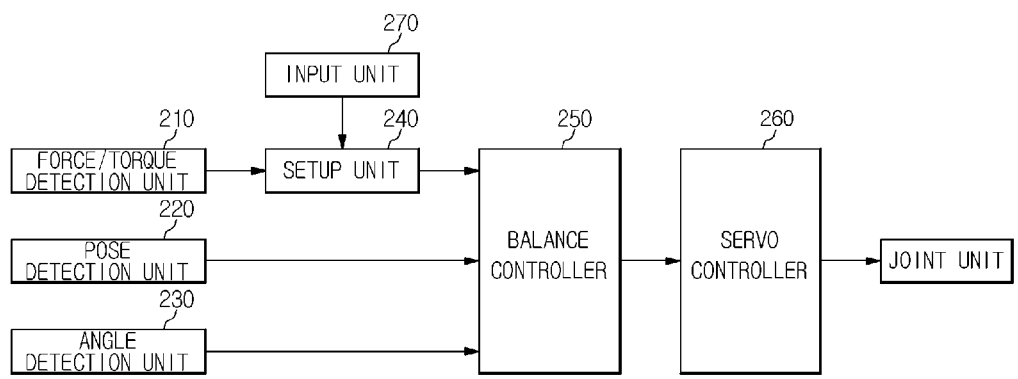
FIG. 3 is a block diagram of a balance control apparatus of the robot in accordance with an example embodiment.

FIG. 3 is a block diagram of a balance control apparatus of the robot in accordance with an example embodiment. Hereinafter, the balance control apparatus will be described with reference to FIGS. 3 to 6.

The balance control apparatus of the robot includes a force/torque detection unit 210, a pose detection unit 220, an angle detection unit 230, a setup unit 240, a COG acquisition unit 251a (refer to FIG. 5), a balance controller 250, a servo controller 260, and an input unit 270.

The force/torque detection unit 210 includes multi-axis force and torque (F/T) sensors provided between the legs 160R and 160L and the feet 170R and 170L, and detects load applied to the feet 170R and 170L.

Here, the force/torque detection unit 210 detects three-directional components Fx, Fy, and Fz of force and three-directional components Mx, My, and Mz of moment transmitted to the feet 170R and 170L, and then transmits these components to the setup unit 240.

The pose detection unit 220 is provided on the torso 130 and detects a pose of the upper body relative to a vertical line. The pose detection unit 220 detects at least one of rotating angles of three axes in the roll, pitch, and yaw directions, and transmits the detected at least one of the rotating angles to the COG acquisition unit 251a and the balance controller 250.

Here, the pose detection unit 220 may use an inertial measurement unit (IMU) to measure inertia.

Further, in order to measure the pose of the upper body of the robot 100, instead of the IMU, a tilting detector or a gyro sensor may be used.

The angle detection unit 230 detects angles of the respective joint units 131, 143, 144, 163, 164 and 165, and particularly rotating angles of the motors provided at respective axes of the respective joint units 131, 143, 144, 163, 164 and 165.

Here, the rotating angles of the respective joint units 131, 143, 144, 163, 164 and 165 which are expressed as rotations per minute (RPMs) of the motors (not shown) may be detected by encoders (not shown) connected to the respective motors.

Hereinafter, a method of representing a pose of a robot will be described. In general, one pose may be represented by angles of all joints of the upper and lower bodies of the robot, and in the present disclosure, the pose of the robot may be represented as follows. The pose of the robot may be represented by the position and angles of the robot corresponding to degrees of freedom of translating motion and degrees of freedom of rotating motion in a working space. The position and angles of the robot may be represented using the position of any one point of the robot representing the position, angles, inclination angles, and orientation angles of pose sensors of the robot. The position of the robot may be represented by a 3-dimensional coordinate set of any one point of the robot in the x-direction, y-direction and z-direction in a reference coordinate system using forward kinematics corresponding to degrees of freedom of 3-axis translating motion. Further, the angles of the robot may be represented by roll, pitch and yaw pose angles using forward kinematics corresponding to degrees of freedom of rotating motion or the pose sensors. Therefore, in the present disclosure, in order to form one pose of the robot, the angles of joints are not set.

Here, from among the position and angles constituting the pose of the robot, any one point representing the position may be a COG of the robot or a capture point. Otherwise, the position of the robot may be represented using one point fixed to a portion of the robot except for the legs or arms as a reference point. The point representing the position of the robot corresponding to the degrees of freedom of translating motion of 3 axes does not need to coincide with one of the COG, the capture point and the reference point, and may be represented in different methods. For example, the poses of the robot corresponding to degrees of freedom of translating motion in the 2-dimensional horizontal directions may be defined as 2-dimensional horizontal components of the capture point, the pose of the robot corresponding to the degree of freedom of translating motion in the 1-dimensional vertical direction may be defined as a hip height, and these poses may be used by the setup unit and balance controller.

Here, the capture point generally means a position where the robot may stand erect in consideration of the position and velocity of the current COG without falling when the robot performs the next walking operation, and is thus defined as a point on a 2-dimensional surface. However, in the present disclosure, the definition of the capture point extends to a 3-dimensional point. In the present disclosure, the capture point is a point moved from the COG in the moving direction of the COG by a distance in proportion to the moving velocity of the COG.

The setup unit 240 stores motion data transmitted from the input unit 270, and sets a target pose corresponding to at least one from among plural degrees of freedom based on motion data stored in advance. Here, the motion data includes at least one pose to perform dancing or walking.

The setup unit 240 judges whether or not the respective feet touch the ground based on loads applied to the respective feet detected by the force/torque detection unit 210, and judges a leg to which load is applied to be in a support state and a leg to which load is not applied to be in a swing state.

The setup unit 240 judges a current pose based on the angles of the plural joint units, the pose angles of the upper body, ground-touching states of the feet, and positions of the feet, judges a next pose by comparing the current pose with the motion data, and sets a target pose to perform the next pose.

During walking based on the FSM, the setup unit 240 may set the target pose based on whether or not the respective legs touch the ground and states of the FSM which are stored in advance.

Here, the capture point CP may be the COG or a projected point COG' of the COG onto the ground surface, and may be expressed by the position of a point moved by a distance corresponding to the moving velocity of the COG or the projected point COG'.

Further, the capture point may be expressed by one virtual point located on a vertical line extending to the ground surface from the COG.

The setup unit 240 may set one point on a line, passing through the inside of a support region formed by two feet in the direction of gravity in order to prevent the robot from falling, as a target capture point, and may set the target capture point as the target pose corresponding to the degrees of freedom of translating motion of the robot.

Further, the target pose angles may be set such that the upper body of the robot is parallel with the gravity direction to achieve the upright pose of the robot, and may be target poses corresponding to the degrees of freedom of rotating motion of the robot.

Hereinafter, state transition of the FSM of the robot 100 during walking of the robot 100 based on the FSM will be described.

Figure 4:
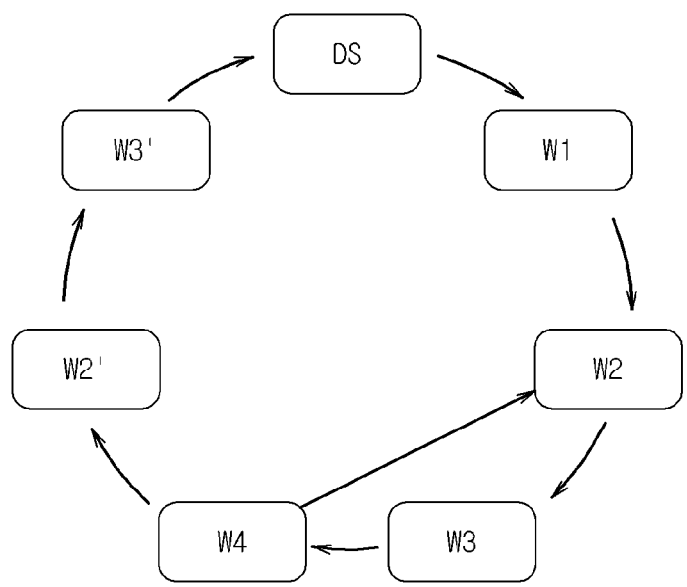
FIG. 4 is a view exemplarily illustrating states of an FSM stored in the robot in accordance with an example embodiment.

FIG. 4 is a view illustrating transition of states of the two feet of the robot based on the FSM.

There are seven states of the two feet of the robot 100 based on the FSM. The states are circulated in order of the DS state→the W1 state→the W2 state→the W3 state→the W4 state→the W2 state→the W3 state→the W4 state→the W2 state→ . . . , or when a stoppage command is input, the W4 state transitions to the DS state via the W2' state and the W3' state corresponding a stoppage preparation motion.

It is understood that the x direction is a lengthwise direction of the support foot, the front of which represents the positive direction, and the y direction is a direction rotated from the x direction by 90 degrees in the counterclockwise direction as seen from the top.

Further, the support foot is the foot which touches the ground to maintain the pose of the robot, and the swing foot is the foot which is lifted upward to move the robot.

In the DS state, the two legs of the robot 100 touch the ground. The W1 state externally does not differ from the DS state, but in the W1 state, the COG of the robot 100 starts to move to one leg when the robot 100 starts walking.

Hereinafter, for example, the case in which the COG of the robot 100 moves to the left leg 160L will be described. In the W2 state, the robot 100 takes a standing pose in which the left leg 160L is supported by the ground while the right leg 160R is lifted upward. In the W3 state, the robot 100 takes a pose in which the right leg 160R is lowered and touches the ground while the robot 100 moves in the progressing direction.

In the W4 state, the robot 100 takes a pose in which the COG of the robot 100 moves to the left leg 160L after the right leg 160R has touched the ground. Then, when the W4 state transitions again to the W2 state, the two legs are interchanged and circulation in order of the W2 state→the W3 state→the W4 state→the W2→ . . . is repeated until the stoppage command is input.

If the stoppage command is input, the W4 state transitions to the W2' state. In the W2' state, the left leg 160L is lifted upward similarly to the W2 state, but the x component of the target capture point is located at the center of the current support foot because the robot 100 does not move forward, i.e., in the x-direction.

In the W3' state, the left foot 170L touches the ground similarly to the W3 state, but the left foot 170L touches the ground at a position in parallel with the right foot 170R because the robot 100 does not move forward, i.e., in the x-direction.

As described above, transition of the respective seven states of the FSM transitions is performed in designated order, and each state transitions to the next state when a designated transition requirement is satisfied.

Next, target capture points in the respective states of the FSM will be described.

First, the DS state is a state in which the two feet 170R and 170L of the robot 100 touch the ground and the robot 100 stops, and the target capture point in the DS state is located at the center of the support polygon formed by the two feet 170R and 170L of the robot 100. At this time, when a walking command is given, the DS state transitions to the W1 state.

The W1 state is a state in which the target capture point moves to the support foot randomly selected from the two feet 170R and 170L of the robot 100, and when an actual capture point enters a stable region within the width of the support foot, the W1 state transitions to the W2 state.

The W2 state is a state in which the robot 100 lifts the swing foot upward, and the x component of the target capture point in the W2 state is set to a trajectory moving from the center of the support foot to the front portion of the support foot according to time and the y component of the target capture point of the W2 state is set to be located at the central line of the support foot.

Further, the lifting of the swing foot is controlled by gravity compensation. When the x component of the current capture point in the W2 state exceeds a threshold value and the height of the swing foot in the W2 state exceeds a threshold value, the W2 state transitions to the W3 state.

The W3 state represents a motion of lowering the swing foot while stretching the knee of the swing foot so as to touch the ground. In the W3 state, the x component of the target capture point is set to a trajectory increasing up to a position at which the swing foot will touch the ground over the front portion of the support foot according to time, and the y component of the target capture point is set to move to the position at which the swing foot will touch the ground according to time.

When the swing foot touches the ground, and thus, the force/torque detection unit 210 senses that the z component is more than a threshold value, the W3 state transitions to the W4 state.

The W4 state is a state in which the two feet of the robot 100 touch the ground under the condition that the foot most recently touching the ground functions as the support foot. In the W4 state, the x and y components of the target capture point are set to trajectories continuously moving from the position of the target capture point in the former state to the center of the new support foot in a short time. When the current capture point enters the support foot, the W4 state transitions to the W2 state if the stoppage command is not given, and transitions to the W2' state if the stoppage command is given.

The W2' state represents a motion similar to the W2 state, i.e., a motion of lifting of the swing foot, but in the W2' state, the x component of the target capture point is fixed to the center of the support foot because the robot 100 does not move forward but stops. When the height of the swing foot is more than the threshold value, the W2' state transitions to W3' state.

The W3' state represents a motion similar to the W3 state, i.e., a motion of lowering the swing foot while stretching the knee of the swing foot so as to touch the ground, however, in the W3' state, the x component of the target capture point does not move to the front portion of the support foot. Instead, the x component is located at the position of the support foot and the y component of the target capture point is set to move the other foot because the robot 100 does not move forward but stops. When the swing foot touches the ground and the z component detected by the force/torque detection unit 210 exceeds the threshold value, the W3' state transitions to the DS state.

The balance controller 250 acquires a current pose corresponding to at least one degree of freedom based on the pose angles and the angles of the plural joint units, calculates a pose error by comparing the current pose with a target pose, calculates compensation forces corresponding to the at least one degree of freedom based on the pose error, and calculates target torques corresponding to the at least one degree of freedom based on the compensation forces.

The balance controller 250 acquires a COG based on the pose angles of the upper body and the angles of the plural joint units, and acquires the current pose using the COG as the position of the robot. The balance controller 250 may also acquire the position and velocity of the COG based on the pose angles of the upper body and the angles of the plural joint units, and acquire the current capture point based on the position and velocity of the COG, and acquire the current pose using the acquired current capture point as the position of the robot. Further, the balance controller 250 may also acquire the position of the reference point of the hip or the upper body based on the pose angles of the upper body and the angles of the plural joint units, and acquire the current pose using the acquired reference point as the position of the robot.

Hereinafter, the balance controller 250 will be described for when the current pose of the robot is acquired using the capture point as the current position of the robot and balance of the robot is controlled.

The balance controller 250 acquires the current capture point based on the COG, and calculates a capture point error by comparing the current capture point with the target capture point transmitted from the setup unit 240.

Further, the balance controller 250 calculates pose angle errors by comparing the current pose angles transmitted from the pose detection unit 220 with the target pose angles transmitted from the setup unit 240, and calculates torques using the pose angle errors and the capture point error.

Further, the balance controller 250 may calculate the current hip height based on the current pose angles transmitted from the pose detection unit 220 and the rotating angles of the respective joint units 131, 143, 144, 163, 164 and 165, calculate a hip height error by comparing the calculated current hip height with the target hip height, and calculate torques by reflecting the hip height error in the pose angle errors and the capture point error.

Here, forward kinematics may be used to calculate the position and velocity of the current COG, the capture point, the positions and directions of the two feet and the hip height.

The servo controller 260 controls torque servos of the respective joint units 163, 164 and 165 so as to reach the torques transmitted from the balance controller 250.

The servo controller 260 compares the torques of the respective joint units with the calculated torques and thus adjusts currents of the motors such that the torques of the respective joint units are close to the calculated torques. In more detail, in order to generate torques calculated by the balance controller 250, the servo controller 260 controls PWMs corresponding to the calculated torques and outputs the controlled PWMs to the motors (not shown) provided on the axes of the respective joint units 163, 164 and 165.

The input unit 270 receives motion data including at least one pose to perform dancing and walking from a user, and transmits the received data to the setup unit 240.

Here, the motion data includes a plurality of sequentially stored poses. That is, the robot 100 performs a motion, such as dancing or walking, by continuously performing the plurality of poses.

One pose includes position data of the links 141, 142, 161 and 162 provided on the torso, the arms, and the legs of the robot 100, or angle data of the respective joint units 131, 143, 144, 163, 164 and 165 provided on the torso, the arms, and the legs of the robot 100. That is, the torso, the arms and the legs of the robot 100 form a specific shape, thus taking one pose.

Figure 5:
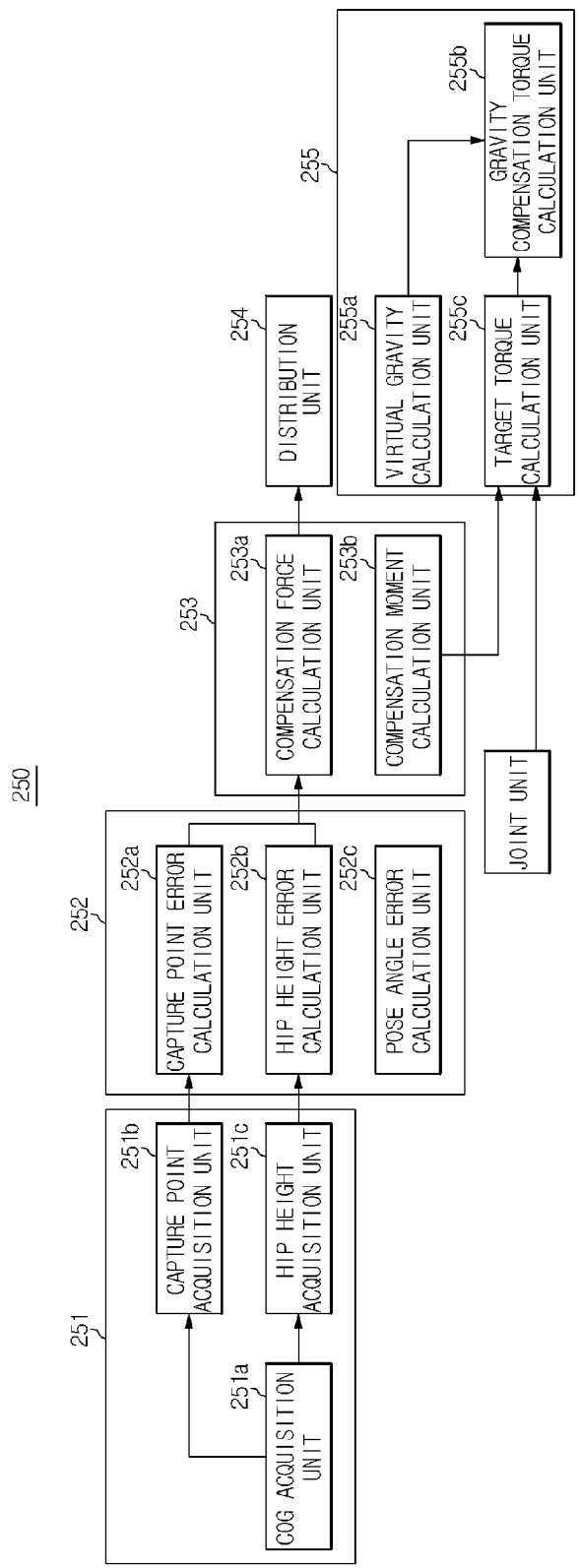
FIG. 5 is a detailed block diagram of the balance control apparatus of the robot in accordance with an example embodiment.

Hereinafter, the balance controller 250 which controls balance of the robot based on the capture point for 2-dimensional horizontal directions from among degrees of freedom of 3-dimensional translating motion, and the hip height for the remaining vertical direction as the reference point will be described in more detail with reference to FIG. 5.

The balance controller 250 includes an acquisition unit 251, an error calculation unit 252, a compensation unit 253, a distribution unit 254 and a torque calculation unit 255.

The acquisition unit 251 includes a COG acquisition unit 251a to acquire the COG of the robot based on the pose angles of the upper body detected by the pose detection unit 220 and the rotating angles of the respective joint units 131, 143, 144, 163, 164 and 165 corresponding to the current pose of the robot, a capture point acquisition unit 251b to acquire the current capture point based on the rotating angles of the respective joint units, and a hip height acquisition unit 251c to acquire the current hip height based on the COG transmitted from the COG acquisition unit 251a.

Here, the capture point has x-axis and y-axis coordinate values which are the coordinate values of horizontal components, and has a z-axis coordinate value which is the coordinate value of a vertical component.

That is, the acquisition unit 251 acquires the x-axis, y-axis and z-axis coordinate values representing the position of the robot based on the COG and the hip height.

Figure 6:
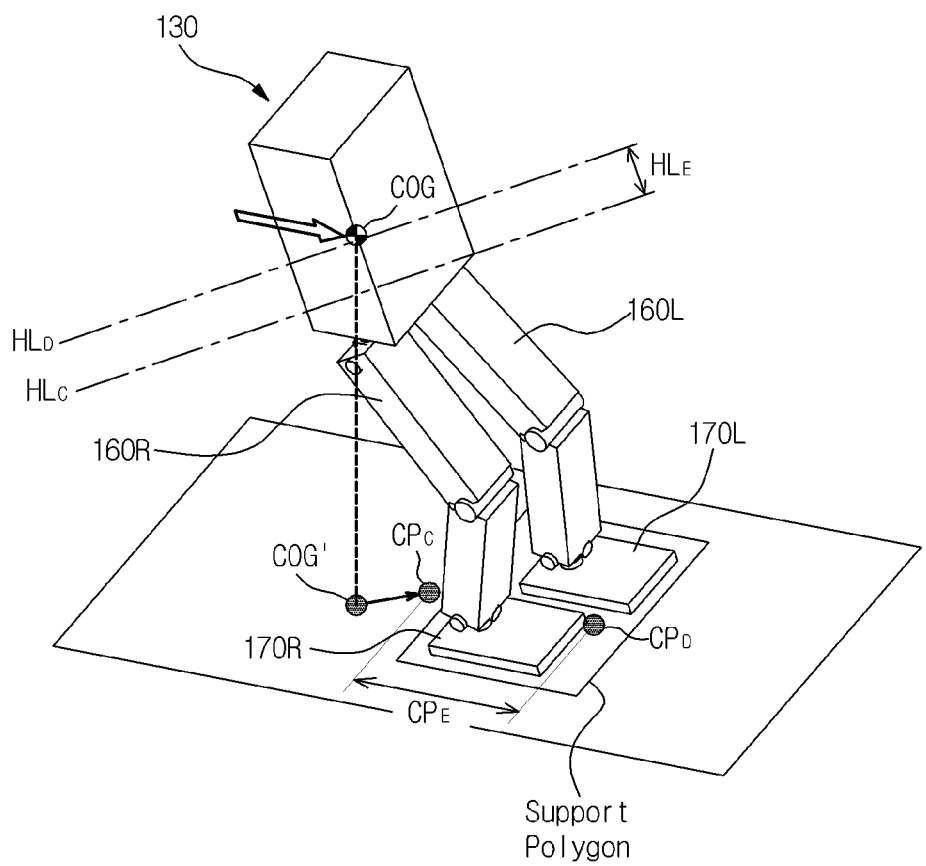
FIG. 6 is a view exemplarily illustrating acquisition of a COG, a capture point and a hip height of the robot in accordance with an example embodiment.

Now, acquisition of the current capture point will be described with reference to FIG. 6.

The acquisition unit 251 calculates the states of the two feet 170R and 170L of the robot 100 and the position and velocity of the COG, and calculates the current capture point $CP_C$ of the robot 100 using the position and velocity of the COG.

In more detail, the acquisition unit 251 calculates the position and velocity of the COG, the hip height, and the positions and directions of the two feet 170R and 170L by applying the angles of the respective joint units 131, 143, 144, 163, 164 and 165, sizes and weights of the links 141, 142, 161 and 162 which are stored in advance, and the pose angles to forward kinematics.

Then, the acquisition unit 251 acquires the current capture point $CP_C$ using the position and velocity of the COG.

The capture point CP is a position where the robot 100 may stand upright based on the position and velocity of the current COG of the robot 100 without falling when the robot 100 performs the next walking motion, and is thus a point on a horizontal surface (i.e., the ground surface). However, in the present disclosure, the capture point CP may be generalized in a 3-dimensional space using the position and velocity of the COG in the vertical direction, as described above.

The capture point at the current position of the robot 100 may be acquired based on Equation 1 below.

$$CP = dCOG + w^* vCOG \qquad \text{Equation 1}$$

Here, CP is a capture point, dCOG is the position of one virtual point located on a vertical line extending to the ground surface from the COG, vCOG is the velocity of the virtual point, and w is $\sqrt{(l/g)}$ in which l is the height from the ground surface to the COG and g is acceleration of gravity.

The error calculation unit 252 includes a capture point error calculation unit 252a to calculate a capture point error $CP_E$ by comparing the current capture point $CP_C$ with the target capture point $CP_D$ transmitted from the setup unit 240, a hip height error calculation unit 252b to calculate a hip height error $HL_E$ by comparing the current hip height $HL_C$ with the target hip height $HL_D$ transmitted from the setup unit 240, and a pose angle error calculation unit 252c to calculate pose angle errors by comparing the current pose angles transmitted from the pose detection unit 220 with the target pose angles transmitted from the setup unit 240.

The compensation unit 253 calculates compensation forces and compensation moments to maintain the upright state of the robot 100.

The compensation unit 253 includes a compensation force calculation unit 253a to calculate the compensation forces based on the capture point error and the hip height error, and a compensation moment calculation unit 253b to calculate the compensation moments based on the pose angle errors.

That is, the compensation force calculation unit 253a calculates compensation forces in the x and y directions which are to be compensated for from the capture point error, and calculates compensation force in the z direction which is to be compensated for from the hip height error, and the compensation moment calculation unit 253b calculates compensation moments in the x, y and z directions which are to be compensated for from the pose angle errors.

That is, the compensation unit 253 calculates the compensation forces in the x, y and z directions and the compensation moments in the x, y and z directions which are to be compensated for to balance the robot 100, and thereby the robot 100 may maintain an upright pose.

The compensation force is calculated by Equation 1 below.

$$CP = dCOG + w^* vCOG \qquad \text{Equation 1}$$

Since a set of coordinates of the horizontal components of the COG is (x, y) and the velocity of the COG is (x', y') obtained by differentiating the set of coordinates of the horizontal components, a relation expression of CP=(x, y)+w(x', y')=(x+wx', y+wy') is satisfied.

A position error (e) of triaxial coordinates in which the capture point and the hip height are reflected is calculated by Equation 2 below.

$$\begin{aligned} e &= ([(x^*, y^*) - (x + wx', y + wy')], z^* - z) \\ &= (x^* - (x + wx'), y^* - (y + wy'), z^* - z) \end{aligned} \qquad \text{Equation 2}$$

Here, $(x^*, y^*)$ represents x and y components of the target capture point, CP is the target capture point, $z^*$ is the target hip height, and z is the current hip height.

The compensation force (f) using the position error (e) of triaxial coordinates is calculated by Equation 3 below.

$$f = k_p e \qquad \text{Equation 3}$$

Here, $k_p$ is force gain, and Proportional (P) control is used.

The compensation moment calculation unit 253*b* calculates moments M (Mx, My, Mz) to be compensated for to balance the robot using the error e calculated by the error calculation unit, on the assumption that there are virtual springs (constant $k_1$) of three axes in the roll direction (rotated around the x-axis), the pitch direction (rotated around the y-axis), and the yaw direction (rotated around the z-axis) of the upper body, calculated by Equation 4 below.

$$M = K1 * e \qquad \text{Equation 4}$$

The distribution unit 254 distributes the compensation forces to the two legs 160R and 160L. The distribution unit 254 distributes a large amount of the compensation force to a leg closer to the point of the COG of the robot 100 projected onto the surface ground using distance rates between the projected point of the COG and the two feet 170R and 170L of the robot 100. The torque calculation unit 255 calculates torques to be transmitted to the respective joint units 163, 164 and 165 based on force compensation and moment compensation. Here, the torques are rotary forces of the motors (not shown).

At this time, the torque calculation unit 255 calculates torques to be applied to the two legs based on the forces distributed by the distribution unit 254.

Further, the torque calculation unit 255 may use gravity compensation. This will be described in more detail.

$$M_L = W_L * M, \; M_R = W_R * M,$$

$$W_L = d_R/(d_R + d_L), \; W_R = 1 - W_L$$

Here, $d_L$ and $d_R$ are distance rates between the COG and the two feet.

The torque calculation unit 255 includes a virtual gravity setup unit 255*a*, a gravity compensation torque calculation unit 255*b* and a target torque calculation unit 255*c*.

The virtual gravity setup unit 255*a* sets intensities of virtual gravity necessary for the respective joints units 163, 164 and 165 of the robot 100 using the current state of the FSM stored in advance and the intensities of the compensation forces calculated by the compensation force calculation unit 253*a*, and the virtual gravity set using the compensation force is calculated by Equation 5 below.

$$g_f = f/m \qquad \text{Equation 5}$$

Here, $g_f$ is virtual gravity, f is compensation force calculated by the compensation force calculation unit 253*a*, and m is mass of the robot 100.

The gravity compensation torque calculation unit 255*b* calculates gravity compensation torques necessary for the respective joint units 163, 164 and 165 to compensate for the virtual gravity set by the virtual gravity setup unit 255*a* and actual gravity. Further, the gravity compensation torques may be calculated using the sum of virtual acceleration of gravity and actual acceleration of gravity, the angles of the respective joint units, the weights of the respective links, and the positions of the COGs in the respective links.

Further, the gravity compensation torque calculation unit 255*b* calculates the gravity compensation torques necessary for the respective joint units 163, 164 and 165 of the respective legs 160R and 160L in consideration of compensation forces distributed to the two legs 160R and 160L.

The target torque calculation unit 255*c* calculates target torques necessary for the respective joint units 163, 164 and 165 of the robot 100 by summing the gravity compensation torques calculated by the gravity compensation torque calculation unit 255*b* and torques corresponding to the compensation moments calculated by the compensation moment calculation unit 253*b*.

Here, the target torque calculation unit 255*c* calculates target torques to generate compensation forces of the respective joints unit 163, 164 and 165 of the right and left legs 160R and 160L in consideration of the compensation forces distributed to the two legs 160R and 160L.

That is, the target torque calculation unit 255*c* allows the leg of the foot closer to the COG to have a larger target torque based on the rates between the COG and the two feet 170R and 170L.

The target torque calculation unit 255*c* may calculate torques to be applied to the plural joints of the two legs using a Jacobian matrix, as below.

$$\tau_{Left} = J^T \begin{bmatrix} 0 \\ M_L \end{bmatrix} \qquad \text{Equation 6}$$

$$\tau_{Right} = J^T \begin{bmatrix} 0 \\ M_R \end{bmatrix}$$

Further, the target torque calculation unit 255*c* may calculate torques r for pose control to be applied to the plural joints of the two legs 160R and 160L from the compensation moments M calculated by the compensation moment calculation unit 253*b* and the gravity compensation torques G(q) calculated by the gravity compensation torque calculation unit 255*b*, using Equation 7 below.

$$\tau_{Left} = J^T \begin{bmatrix} 0 \\ M_L \end{bmatrix} + G(q_L) \qquad \text{Equation 7}$$

$$\tau_{Right} = J^T \begin{bmatrix} 0 \\ M_R \end{bmatrix} + G(q_R)$$

In Equation 7, a joint torque r is a 6-vector.

In Equation 7, J is a 6-by-6 Jacobian matrix on the assumption that the foot 170R or 170L is a base link of the robot 100 and the COG is an end effector presenting on the upper body.

The Jacobian matrix is a matrix which may convert a velocity of a joint space into a velocity of a working space, and is induced from Forward Kinematics. In order to convert moment in a Cartesian Space into joint torque, a Jacobian matrix is used.

In Equation 7, the gravity compensation torque G(q) may be calculated from the angles q of all joints belonging to each of the respective feet 170R and 170L, the masses of all links belonging to each of the respective feet 170R and 170L, the position of the COG and the total mass of the upper body.

$q_L$ represents the angles q of all joints belonging to the left foot 170L, and $q_R$ represents the angles q of all joints belonging to the right foot 170R. The joint torques include the torque $T_{Left}$ of the left foot 170L and the torque $T_{Right}$ of the right foot 170R.

Figure 7:
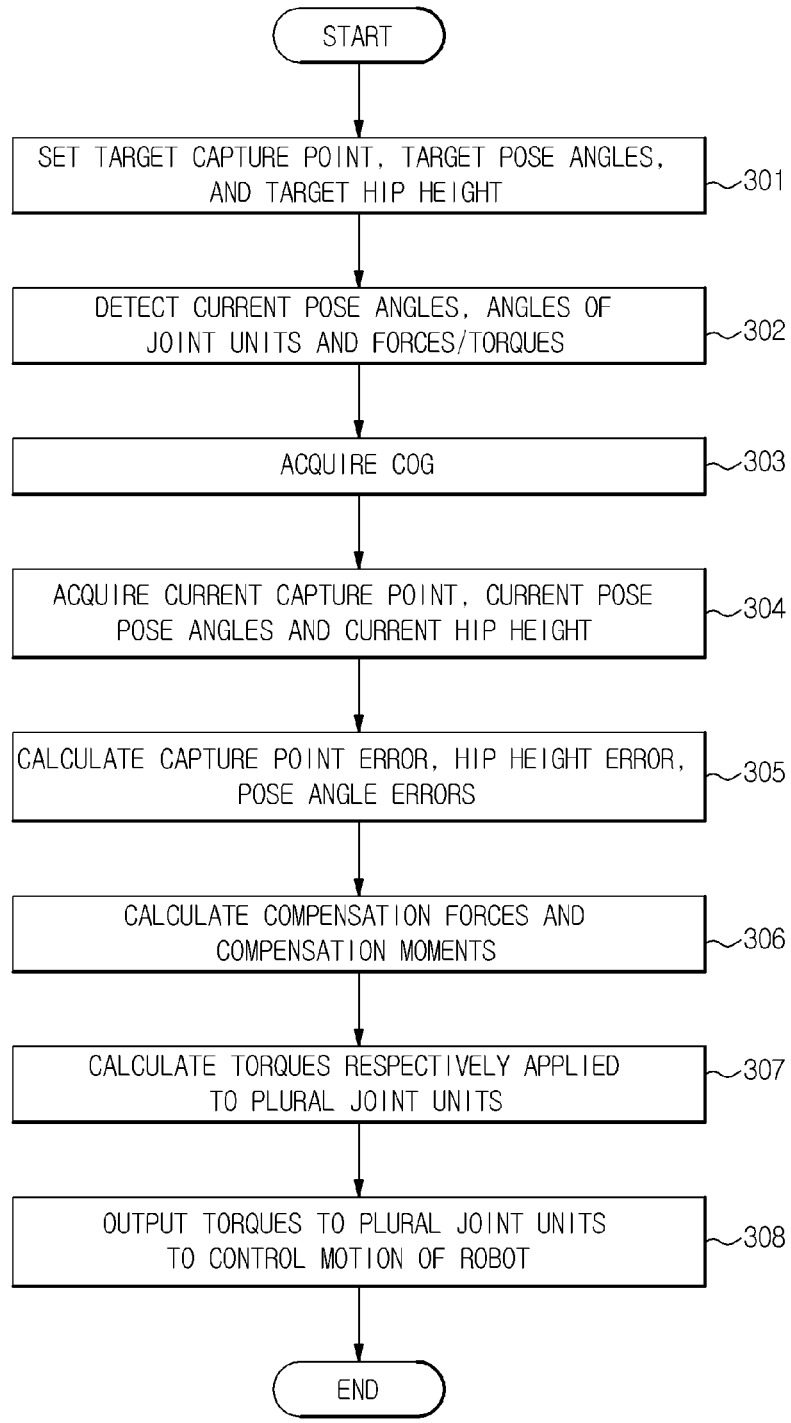
FIG. 7 is a flowchart illustrating a balance control method of the robot in accordance with an example embodiment.

FIG. 7 is a flowchart illustrating a balance control method of the robot in accordance with an embodiment.

The robot 100 sets a target capture point, target pose angles, and target hip height (Operation 301). Further, the robot 100 detects pose angles of the upper body and angles of the plural joint units, and acquires a current pose based on the pose angles, the angles of the plural joint units, and the forces/torques (Operation 302). The current pose of the robot 100 is represented by the current position of the robot 100 corresponding to degrees of freedom of translating motion and the current pose angles of the robot 100 corresponding to degrees of freedom of rotating motion.

Thereafter, the robot 100 calculates a pose error by comparing a pose based on at least one of the plural degrees of freedom of translating motion with a predetermined target pose (Operation 303).

Here, the robot 100 detects the position of a current COG corresponding to the at least one degree of freedom of translating motion based on the detected pose angles and angles of the plural joint units, and calculates a COG error by comparing the detected current COG with a predetermined target COG.

The COG error may be used as the pose error corresponding to the at least one degree of freedom.

Further, the robot 100 may detect the position and velocity of a current COG corresponding to at least one degree of freedom based on the detected pose angles and angles of the plural joint units, acquire a current capture point corresponding to the at least one degree of freedom based on the detected position and velocity of the current COG (Operation 304), calculate a capture point error corresponding to the at least one degree of freedom by comparing the current capture point with a predetermined capture point (Operation 305), and use the calculated capture point error as a pose error corresponding to the at least one degree of freedom.

Further, the robot 100 may acquire the position of any one point of the hip or the upper body based on the detected pose angles and angles of the plural joint units as a current reference position corresponding to at least one degree of freedom, calculate a reference point position error corresponding to the at least one degree of freedom by comparing the current reference point with a predetermined target reference point, and use the calculated reference point position error as a pose error corresponding to the at least one degree of freedom.

Further, pose error calculation of the remaining degrees of freedom of translating motion may be equal to or different from the pose error calculation of the at least one degree of freedom of translating motion.

Thereafter, the robot 100 calculates compensation forces corresponding to the at least one degree of freedom of translating motion based on the calculated pose errors (Operation 306).

Thereafter, the robot 100 calculates torques corresponding to the at least one degree of freedom of translating motion based on the compensation forces corresponding to the at least one degree of freedom of translating motion (Operation 307). Here, the robot 100 calculates torques of the plural joint units corresponding to degrees of freedoms of translating motion.

Further, the robot 100 may calculate target torques of the plural joint units based on compensation forces corresponding to the remaining degrees of freedom of translating motion, calculate final target torques by adding the torques which are calculated in advances to the target torques corresponding to all degrees of freedom of translating motion, and output the final target torques to the plural joint units (Operation 308).

Here, the torques calculated in advance may be torques calculated from compensation moments to compensate for errors between the target pose angles and the current pose angles corresponding to degrees of freedom of rotating motion by the Jacobian matrix of Equation 6, or be acquired by adding torques including damping torques to be applied to the respective joint units to these torques to increase stability.

Thereafter, the robot 100 outputs the final target torques to the plural joint units to control balance of the robot 100 (Operation 308).

Figure 8:
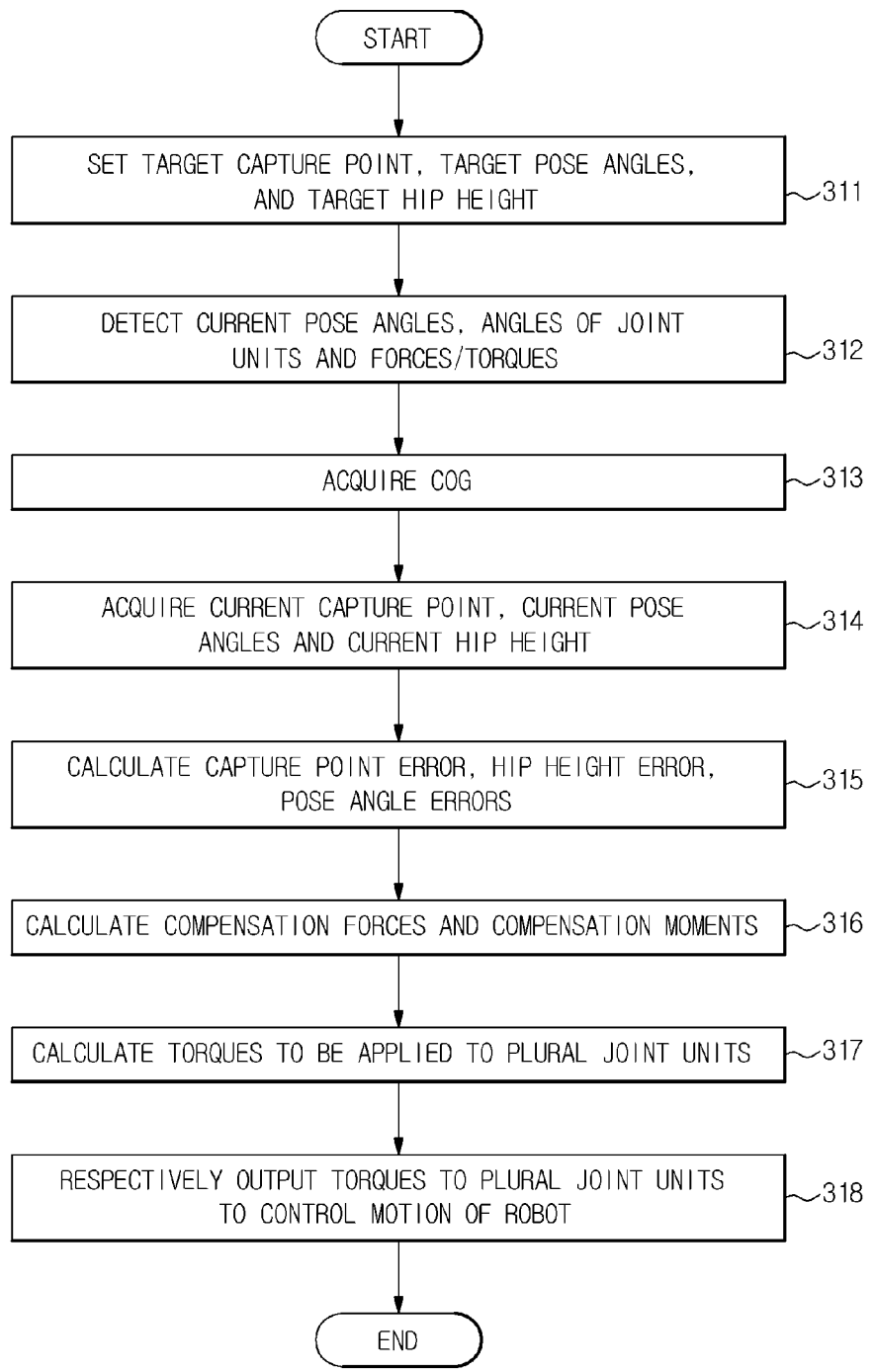
FIG. 8 is a flowchart illustrating the balance control method of the robot in accordance with an example embodiment in detail.

FIG. 8 is a flow chart illustrating a balance control method of the robot which controls balance based on the capture point, in detail.

The robot 100 drives the plural motors (not shown) installed at the respective joint units 131, 143, 144, 163, 164 and 165 based on a user command received through the input unit 270 and a pose of the robot 100, thus performing a motion.

As the robot performs dancing or walking, based on motion data received from a user, the robot 100 judges a current pose based on the angles of the plural joint units and the pose angles of the upper body, judges a next pose by comparing the current pose with the motion data received through the input unit 270, and sets a target capture point, target pose angles and a target hip height to specifically represent the next pose (Operation 311).

Further, as the robot performs walking based on the FSM, the robot may judge a current walking state based on the states of the FSM which are stored in advance, and set the target capture point, the target pose angles and the target hip height based on the judged current walking state.

At this time, the robot 100 detects the positions and directions of the two feet 170R and 170L using forces/torques applied to the two legs 160R and 160L, judges the current walking state based on the positions of the two feet 170R and 170L and the states of the FSM stored in advance, and sets the target capture point, the target pose angles and the target hip height based on the judged current walking state.

The robot 100 calculates an error between the current pose and the next pose, i.e., a target pose, and performs the next pose while keeping balance by compensating for the calculated error. Hereinafter, this will be described in more detail.

The robot 100 detects forces/torques applied to the two legs 160R and 160L, the current pose angles of the upper body and the angles of the plural joint units 131, 143, 144, 163, 164 and 165 through the force/torque detection unit 210, the pose detection unit 220 and the angle detection unit 230 (Operation 312).

Thereafter, the robot 100 acquires the COG of the robot 100 based on the pose angles of the upper body, the angles of the respective joint units 131, 143, 144, 163, 164 and 165 and the positions and directions of the feet 170R and 170L detected through the force/torque detection unit 210, the pose detection unit 220 and the angle detection unit 230 (Operation 313).

Thereafter, the robot 100 acquires a current capture point based on the COG, acquires a current hip height based on the pose angles and the angles of the plural respective units 131, 143, 144, 163, 164 and 165, and acquires the pose angles in three axis directions, i.e., yaw, roll, and pitch directions, detected by the pose detection unit 220 (Operation 314).

Here, forward kinematics is used to acquire the position and velocity of the current COG of the robot 100 and the hip height.

The compensation force of the robot 100 is calculated by Equation 1 below using the position and velocity of the COG.

$$CP = dCOG + w \ast vCOG \quad \text{Equation 1}$$

Here, CP is a capture point, dCOG is the position of one virtual point located on a vertical line extending to the ground surface from the COG, vCOG is the velocity of the virtual point, and w is $\sqrt{(l/g)}$ in which l is the height from the ground surface to the COG and g is acceleration of gravity.

Further, w may be a positive value.

Thereafter, the robot 100 calculates a capture point error by comparing the current capture point with the target capture point, calculates a hip height error by comparing the current hip height with the target hip height, and calculates pose angle errors by comparing the current pose angles with the target pose angles (Operation 315).

Thereafter, the robot 100 acquires x-axis and y-axis coordinate values in the horizontal direction from the capture point error, and calculates compensation forces in the x and y directions (Operation 316).

Further, the robot 100 acquires a z-axis coordinate value in the vertical direction from the hip height error, and calculates compensation force in the z direction.

The compensation force is calculated by Equation 1 below.

$$CP = dCOG + w^* vCOG \qquad \text{Equation 1}$$

Since a set of coordinates of the horizontal components of the COG is (x, y) and the velocity of the COG is (x', y') obtained by differentiating the set of coordinates of the horizontal components, a relation expression of CP=(x, y)+w(x', y')=(x+wx', y+wy') is satisfied.

A position error (e) of triaxial coordinates in which the capture point and the hip height are reflected is calculated by Equation 2 below.

$$e = ([(x^*, y^*) - (x + wx', y + wy')], z^* - z) \qquad \text{Equation 2}$$
$$= (x^* - (x + wx'), y^* - (y + wy'), z^* - z)$$

Here, (x*, y*) represents x and y components of the target capture point, CP is the target capture point, z* is the target hip height, and z is the current hip height.

The compensation force (f) using the position error (e) of triaxial coordinates is calculated by Equation 3 below.

$$f = k_p e \qquad [\text{Equation 3}]$$

Here, $k_p$ is force gain, and Proportional (P) control is used.

Thereafter, the robot 100 distributes a large amount of the compensation forces to a leg closer to the point of the COG of the robot 100 projected onto the surface ground using distance rates between the projected point of the COG and the two feet 170R and 170L of the robot 100.

Thereafter, the robot 100 sets intensities of virtual gravity necessary for the respective joints units 163, 164 and 165 of the robot 100 using the current state of the FSM stored in advance and the intensities of the compensation forces calculated by the compensation force calculation unit 253a.

The virtual gravity set using the compensation force is calculated by Equation 4 below.

$$g_f = f/m \qquad \text{Equation 4}$$

Here, $g_f$ is virtual gravity, f is compensation force calculated by the compensation force calculation unit 253a, and m is mass of the robot 100.

Thereafter, the robot 100 calculates compensation moments in the yaw, roll and pitch directions based on the pose angle errors (Operation 316).

Since there is no order to calculation of the compensation forces and calculation of the compensation moments, calculation of the compensation forces and calculation of the compensation moments may be reversed.

Thereafter, the robot 100 calculates gravity compensation torques necessary for the respective joint units 163, 164 and 165 to compensate for the virtual gravity and actual gravity, and the gravity compensation torques are calculated using the sum of virtual acceleration of gravity and actual acceleration of gravity, the angles of the respective joint units, the weights of the respective links, and the positions of the COGs in the respective links (Operation 317).

Here, the gravity compensation torques necessary for the respective joint units 163, 164 and 165 of the respective legs 160R and 160L are calculated in consideration of compensation forces distributed to the two legs 160R and 160L.

Thereafter, the robot 100 calculates target torques necessary for the respective joint units 163, 164 and 165 of the robot 100 by summing the gravity compensation torques and torques corresponding to the compensation moments (Operation 317).

Here, the target torques to generate compensation forces of the respective joints unit 163, 164 and 165 of the right and left legs 160R and 160L are calculated in consideration of the compensation forces distributed to the two legs 160R and 160L.

Thereafter, the robot 100 outputs the calculated target torques to the respective joint units 163, 164 and 165 of the right and left legs 160R and 160L, thus performing a balanced motion (Operation 318).

This embodiment relates to balance control of a robot having plural degrees of freedom, and respectively calculates torques corresponding to the plural degrees of freedom using a point and a hip height.

Thereby, the robot 100 may keep balance during performance of the motion, thus flexibly and stably performing the motion.

Figure 9:
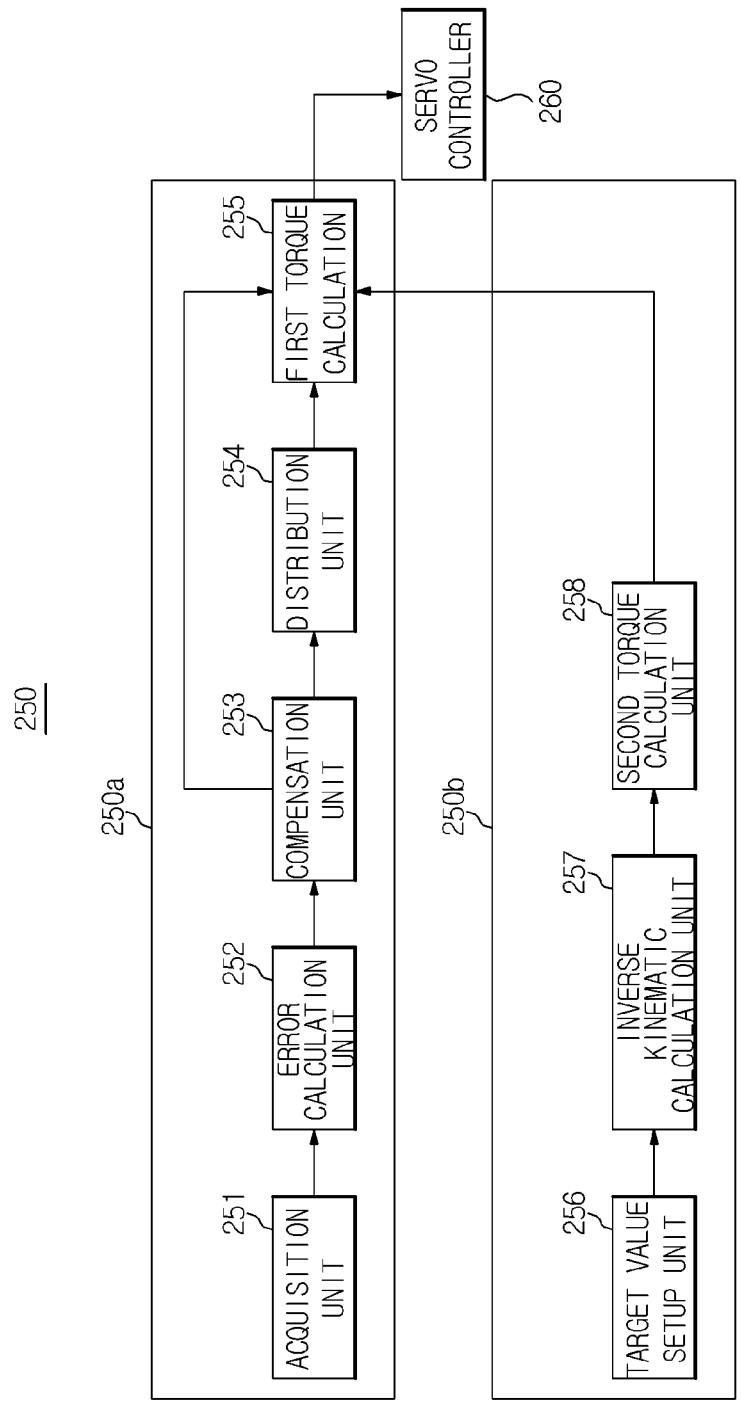
FIG. 9 is a block diagram of a balance control apparatus of a robot in accordance with another example embodiment.

FIG. 9 is a block diagram of a balance control apparatus of a robot in accordance with another embodiment of the present disclosure, and illustrates only a balance controller 250 differing from that of the former embodiment in detail.

The balance controller 250 of the balance control apparatus of the robot in accordance with this embodiment includes a first balance controller 250a and a second balance controller 250b.

The first balance controller 250a calculates a first torque corresponding to at least one degree of freedom from among plural degrees of freedom. Here, the first balance controller 250a calculating the first torque corresponding to the at least one degree of freedom is the same as the balance controller 250 in accordance with the former embodiment, and a detailed description thereof will thus be omitted.

The second balance controller 250b of the present embodiment calculates second torques corresponding to the remaining degrees of freedom from among the plural degrees of freedom.

Further, the first balance controller 250a calculates target torques by summing the first torque corresponding to the at least one degree of freedom and the second torques corresponding to the remaining degrees of freedom, and transmits the calculated target torques to the servo controller 260.

Here, the second balance controller 250b or the servo controller 260 may sum the first torque and the second torques.

Further, an acquisition unit 251 of the first balance controller 250a acquires a position and a velocity corresponding to the at least one degree of freedom when the acquisition unit 251 acquires a capture point.

For example, if the at least one degree of freedom includes a degree of freedom of a translating motion in the x-axis direction and a degree of freedom of a roll rotating motion in the x-axis direction and the remaining degrees of freedom include a degree of freedom of a translating motion in the y-axis direction and a degree of freedom of a pitch rotating motion in the y-axis direction, the acquisition unit 251 of the first balance controller 250a acquires a position and a velocity in the x-axis direction, and acquires a capture point using the acquired position and velocity in the x-axis direction.

Hereinafter, the second balance controller 250b will be described in detail.

The second balance controller 250b includes a target value setup unit 256, an inverse kinematic calculation unit 257 and a second torque calculation unit 258.

Now, a case in which the remaining degrees of freedom include a degree of freedom of a translating motion in the y-axis direction and a degree of freedom of a pitch rotating motion in the y-axis direction will be exemplarily described.

The target value setup unit 256 sets a target position corresponding to the degree of freedom of the translating motion in the y-axis direction, and sets a target angle corresponding to the degree of freedom of the pitch rotating motion in the y-axis direction.

The inverse kinematic calculation unit 257 calculates a solution of inverse kinematics satisfying the target position and target angle set by the target value setup unit 256.

The second torque calculation unit 258 calculates target angles of plural joint units using the solution of inverse kinematics, and calculates second torques to track the calculated target angles of the plural joint units.

Further, the respective joint units 163, 164 and 165 include a plurality of joints having degrees of freedom of translating motions and degrees of freedom of rotating motions of respective axes, as shown in FIG. 2.

That is, the first balance controller 250a calculates torques to be applied to the rotary joints 163c in the roll direction of the hip joint units 163 and the rotary joints 165b in the roll direction of the ankle joint units 165 so as to achieve the degree of freedom of the translating motion and the degree of freedom of the rotating motion in the x-axis direction. Further, the first balance controller 250a calculates torques to be applied to the rotary joints 163a in the yaw direction of the hip joint units 163 so as to achieve the degree of freedom of the translating motion and the degree of freedom of the rotating motion in the z-axis direction.

Further, the second balance controller 250b calculates torques to be applied to the rotary joints 163b in the pitch direction of the hip joint units 163 and the rotary joints 164a in the pitch direction of the knee joint units 164, and the rotary joints 165a in the pitch direction of the ankle joint units 165 so as to achieve the degree of freedom of the translating motion and the degree of freedom of the rotating motion in the y-axis direction.

FIG. 10 is a flowchart illustrating a balance control method of the robot in accordance with another embodiment.

Hereinafter, a case in which at least one degree of freedom includes a degree of freedom of a translating motion in the x-axis direction and a degree of freedom of a roll rotating motion in the x-axis direction and the remaining degrees of freedom include a degree of freedom of a translating motion in the y-axis direction and a degree of freedom of a pitch rotating motion in the y-axis direction will be exemplarily described.

First, the robot confirms positions and directions of the two feet by detecting forces/torques applied to the two legs during a motion, and sets a target capture point, target pose angles and a target hip height based on the positions and directions of the two feet (Operation 401).

Here, the target capture point has position information based on at least one degree of freedom.

The robot calculates an error between the current pose and the next pose, i.e., a target pose, and performs the next pose while keeping balance by compensating for the calculated error. Hereinafter, this will be described in more detail.

Thereafter, the robot detects forces/torques applied to the two legs, the current pose angles of the upper body and the angles of the plural joint units 131, 143, 144, 163, 164 and 165 through the force/torque detection unit 210, the pose detection unit 220 and the angle detection unit 230 while performing the motion (Operation 402).

Thereafter, the robot acquires the COG based on the pose angles of the upper body, the angles of the respective joint units 131, 143, 144, 163, 164 and 165 and the positions and directions of the feet 170L and 170R detected through the force/torque detection unit 210, the pose detection unit 220 and the angle detection unit 230 (Operation 403).

Thereafter, the robot acquires a current capture point based on the COG, acquires a current hip height based on the pose angles and the angles of the plural respective units 131, 143, 144, 163, 164 and 165, and acquires the pose angles in three axis directions, i.e., yaw, roll, and pitch directions, detected by the pose detection unit 220 (Operation 404).

Thereafter, the robot acquires the position of the current capture point using the position and velocity of the COG. Here, the robot acquires the position of the current capture point in at least one direction.

Thereafter, the robot calculates a capture point error by comparing the current capture point with the target capture point, calculates a hip height error by comparing the current hip height with the target hip height, and calculates pose angle errors by comparing the current pose angles with the target pose angles (Operation 405).

Thereafter, the robot acquires at least one of x-axis and y-axis coordinate values in the horizontal direction from the capture point error, and calculates compensation force in at least one direction of the x and y directions (Operation 406).

Further, the robot acquires a z-axis coordinate value in the vertical direction from the hip height error, and calculates compensation force in the z direction.

Thereafter, the robot distributes a large amount of the compensation forces to a leg closer to the point COG' of the COG projected onto the surface ground using distance rates between the projected point COG' and the two feet 170R and 170L of the robot.

Thereafter, the robot sets intensities of virtual gravity necessary for the respective joints units 163, 164 and 165 of the robot using the current state of the FSM set in advance and the intensities of the compensation forces calculated by the compensation force calculation unit 253a.

Thereafter, the robot calculates compensation moments in the yaw, roll, and pitch directions based on the pose angle errors (Operation 406).

Since there is no order to calculation of the compensation forces and calculation of the compensation moments, calculation of the compensation forces and calculation of the compensation moments may be reversed.

Thereafter, the robot calculates gravity compensation torques necessary for the respective joint units 163, 164 and 165 to compensate for the virtual gravity and actual gravity, and the gravity compensation torques are calculated using the sum of virtual acceleration of gravity and actual acceleration of gravity, the angles of the respective joint units, the weights of the respective links, and the positions of the COGs in the respective links.

Here, the gravity compensation torques necessary for the respective joint units 163, 164 and 165 of the respective legs 160R and 160L are calculated in consideration of compensation forces distributed to the two legs 160R and 160L.

Thereafter, the robot calculates first torque corresponding to at least one degree of freedom of the respective joint units 163, 164 and 165 of the robot by summing the gravity compensation torques and torques corresponding to the compensation moments (Operation 407).

Here, the first torques to generate compensation forces of the respective joint units 163, 164 and 165 of the right and left legs 160R and 160L are calculated in consideration of the compensation forces distributed to the right and left legs 160R and 160L.

That is, the robot calculates torques to be applied to the rotary joints 163c in the roll direction of the hip joint units 163 and the rotary joints 165b in the roll direction of the ankle joint units 165 so as to achieve the degree of freedom of the translating motion and the degree of freedom of the rotating motion in the x-axis direction. Further, the robot calculates torques to be applied to the rotary joints 163a in the yaw direction of the hip joint units 163 so as to achieve the degree of freedom of the translating motion and the degree of freedom of the rotating motion in the z-axis direction.

Thereafter, the robot sets target values corresponding to the remaining degrees of freedom (Operation 408). That is, the robot sets target positions corresponding to the degree of freedom of the translating motion in the y-axis direction, and sets target angles corresponding to the degree of freedom of the pitch rotating motion in the y-axis direction.

Thereafter, the robot calculates a solution of inverse kinematics satisfying the set target positions and target angles (Operation 409), and calculates target angles of the plural joint units using the calculated solution of inverse kinematics (Operation 410).

Here, the target angles of the rotary joints in the pitch direction of the hip joint units, the rotary joints in the pitch direction of the knee joint units and the rotary joints in the pitch direction of the ankle joint units, having a degree of freedom in the y-axis direction, are calculated.

Thereafter, the robot sets gain to control the angles of the joint units, and calculates second torques to track the calculated target angles of the plural joint units based on the set gain (Operation 411). Here, the second torques are n-dimensional vectors (n being the number of the joints).

Here, the robot calculates torques to be applied to the rotary joints 163b in the pitch direction of the hip joint units 163 and the rotary joints 164a in the pitch direction of the knee joint units 164, and the rotary joints 165a in the pitch direction of the ankle joint units 165 so as to achieve the degree of freedom of the translating motion and the degree of freedom of the rotating motion in the y-axis direction.

Thereafter, the robot calculates target torques to be applied to the plural joint units by summing the first torques and the second torques (Operation 412), and then outputs the calculated target torques to the respective joint units 163, 164 and 165 of the right and left legs 160R and 160L, thus performing a balanced motion (Operation 413).

Thereby, the robot may maintain a pose satisfying the target values corresponding to the plural degrees of freedom.

FIG. 11 is a flowchart illustrating a balance control method of a robot in accordance with yet another embodiment. A balance control apparatus of the robot in accordance with this embodiment will be described with reference to FIG. 3.

The balance control apparatus of the robot in accordance with this embodiment includes an input unit 270 which inputs the angle of at least one joint unit so that the at least one joint unit moves according to a user's intention so long as a pose of the robot to perform a given motion is maintained.

Here, the balance controller 250 calculates second torque to track the angle of the at least one joint unit, and calculates a target torque by summing the calculated second torque and first torque.

Herein, the first torque is torque to be applied to each of plural joint units calculated based on a capture point and a hip height, and is calculated in the same method as the former embodiment.

Hereinafter, the balance control method of the robot in accordance with this embodiment will be described with reference to FIG. 11.

First, the robot confirms positions and directions of the two feet by detecting forces/torques applied to the two legs during a motion, and sets a target capture point, target pose angles and a target hip height based on the positions and directions of the two feet (Operation 501).

Thereafter, the robot calculates an error between the current pose and the next pose, i.e., a target pose, and specifically represents the next pose while keeping balance by compensating for the calculated error. Hereinafter, this will be described in more detail.

The robot detects forces/torques applied to the two legs, the pose angles of the upper body and the angles of the plural joint units 131, 143, 144, 163, 164 and 165 through the force/torque detection unit 210, the pose detection unit 220, and the angle detection unit 230 while performing the motion (Operation 502), and acquires the COG based on the pose angles of the upper body, the angles of the respective joint units 131, 143, 144, 163, 164 and 165, and the positions and directions of the feet 170L and 170R detected through the force/torque detection unit 210, the pose detection unit 220 and the angle detection unit 230 (Operation 503).

Thereafter, the robot acquires a current capture point based on the COG, acquires a current hip height based on the pose angles and the angles of the plural respective units 131, 143, 144, 163, 164 and 165, and acquires the pose angles in three axis directions, i.e., yaw, roll, and pitch directions, detected by the pose detection unit 220 (Operation 504).

Thereafter, the robot acquires the position of the current capture point using the position and velocity of the COG.

Thereafter, the robot calculates a capture point error by comparing the current capture point with the target capture point, calculates a hip height error by comparing the current hip height with the target hip height, and calculates pose angle errors by comparing the current pose angles with the target pose angles (Operation 505).

Thereafter, the robot acquires x-axis and y-axis coordinate values in the horizontal direction from the capture point error, and calculates compensation forces in the x and y directions (Operation 506).

Further, the robot acquires a z-axis coordinate value in the vertical direction from the hip height error, and calculates compensation force in the z direction.

Thereafter, the robot distributes a large amount of the compensation forces to a leg closer to the point COG' of the COG projected onto the surface ground using distance rates between the projected point COG' and the two feet 170R and 170L of the robot.

Thereafter, the robot sets intensities of virtual gravity necessary for the respective joints units 163, 164 and 165 of the robot using the current state of the FSM stored in advance and the intensities of the compensation forces calculated by the compensation force calculation unit 253a.

Thereafter, the robot calculates compensation moments in the yaw, roll, and pitch directions based on the pose angle errors (Operation 506).

Thereafter, the robot calculates gravity compensation torques necessary for the respective joint units 163, 164 and 165 to compensate for the virtual gravity and actual gravity, and the gravity compensation torques are calculated using the sum of virtual acceleration of gravity and actual acceleration of gravity, the angles of the respective joint units, the weights of the respective links, and the positions of the COGs in the respective links.

Here, the gravity compensation torques necessary for the respective joint units 163, 164 and 165 of the respective legs 160R and 160L are calculated in consideration of compensation forces distributed to the two legs 160R and 160L.

Thereafter, the robot calculates first torques to be applied to the respective joint units 163, 164, and 165 of the robot by summing the gravity compensation torques and torques corresponding to the compensation moments (Operation 507).

Thereafter, the robot judges whether or not the angle of at least one joint unit is input through the input unit 270, and sets the input angle as a target angle of the at least one joint unit upon judging that the angle of the at least one joint unit is input (Operation 508).

Thereafter, the robot calculates errors between the set target angles and actual angles (Operation 509).

Here, the actual angle is an angle of the at least one joint unit when the first torque is applied to the at least one joint unit.

Further, the error is an angle error vector of the at least one joint unit.

That is, the robot calculates a second torque T using an angle error vector E to track the angle of the at least one joint unit (Operation 510), using the equation below.

$$T = K * E$$

Here, T is a r-dimensional torque vector of at least one joint, K is control gain representing a Scalar or r×r diagonal matrix, and r is the number of joint units to which angles are input.

Further, if at least one joint unit includes plural joints, angles of the plural joints may be respectively input, or only an angle of at least one joint of the plural joints may be input.

Thereafter, the robot calculates target torques to be applied to the plural joint units by summing the first torques and the second torques (Operation 511).

Thereafter, the robot outputs the calculated target torques to the respective joint units 163, 164 and 165 of the right and left legs 160R and 160L, thus performing a balanced motion (Operation 512).

Thereby, the robot may maintain a desired shape of at least one joint unit while performing post control. Further, the robot may maintain a pose satisfying a user's intention while keeping balance according to selection of a joint unit, the angle of which is to be controlled.

As is apparent from the above description, in a balance control apparatus of a robot and a control method thereof in accordance with an embodiment, torques of plural joint units to keep balance of the robot in the next pose are acquired using a capture point obtained by combining the position and velocity of the COG of the robot, thereby enabling the robot to keep balance in environments having many disturbances.

Further, since a pose of the upper body of the robot is controlled, the robot may stably keep balance without falling on an inclined plane or an uneven plane, thus actively coping with an external disturbance.

Moreover, the robot may walk without bending knees, thus being capable of walking with long strides and effectively using energy necessary for walking.

The embodiments can be implemented in computing hardware and/or software, such as (in a non-limiting example) any computer that can store, retrieve, process and/or output data and/or communicate with other computers. For example, the balance controller 250 in FIG. 3 may include a computer to perform operations and/or calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A balance control method of a robot with a plurality of degrees of freedom of translating motion and degrees of freedom of rotating motion, the robot having a plurality of legs and an upper body connected to the plurality of legs, each leg having a plurality of joint units, the method comprising:
   detecting pose angles of the upper body and angles of the plurality of joint units;
   acquiring a current pose based on the pose angles and the angles of the plurality of joint units;
   calculating a pose error corresponding to at least one degree of freedom of the translating motion from among the plurality of degrees of freedom of the translating motion based on the current pose and a set target pose;
   calculating compensation forces corresponding to the at least one degree of freedom of the translating motion based on the calculated pose error;
   respectively calculating target torques of the plurality of joint units corresponding to the at least one degree of the freedom of translating motion based on the calculated compensation forces; and
   outputting the calculated target torques to the plurality of joint units to control the balance of the robot, wherein the calculating the pose error includes,
      detecting a position and a velocity of a current center of gravity (COG) based on the detected pose angles and the angles of the plurality of joint units, the COG corresponding to the at least one degree of freedom of the translating motion,
      acquiring a current capture point corresponding to the at least one degree of freedom of the translating motion based on the detected position and velocity of the current COG,
      calculating a capture point error corresponding to the at least one degree of freedom of the translating motion by comparing the current capture point with a set target capture point, and
      using the capture point error as the pose error.

2. The balance control method according to claim 1, wherein the respectively calculating the target torques comprises:
   calculating target torque sums by adding the target torques corresponding to the at least one degree of freedom of the translating motion to target torques corresponding to remaining degrees of freedom of the translating motion.

3. The balance control method according to claim 1, wherein the calculating the pose error comprises:
  calculating a position of any one current reference point of a hip or the upper body of the robot corresponding to the at least one degree of freedom of the translating motion based on the detected pose angles and angles of the plurality of joint units;
  calculating a reference point position error corresponding to the at least one degree of freedom of the translating motion by comparing the position of the current reference point with a position of a set target reference point; and
  using the reference point position error as the pose error.

4. The balance control method according to claim 1, wherein the calculating of the pose error corresponding to the at least one degree of freedom of the translating motion is different from calculation of pose errors corresponding to remaining degrees of freedom of the translating motion.

5. The balance control method according to claim 1, wherein the calculating the compensation forces comprises:
  acquiring the current capture point and a current hip height;
  calculating the capture point error by comparing the current capture point with the set target capture point;
  calculating a hip height error by comparing the current hip height with a set target hip height; and
  calculating the compensation forces based on the capture point error and the hip height error.

6. The balance control method according to claim 5, wherein the acquiring the current capture point comprises:
  acquiring the position and the velocity of the center of gravity (COG) based on the pose angles of the upper body and the angles of the plurality of joint units; and
  acquiring the current capture point based on the acquired position and velocity of the COG.

7. The balance control method according to claim 5, wherein the acquiring the current hip height comprises:
  calculating the current hip height based on the center of gravity (COG) and the angles of the plurality of joint units.

8. The balance control method according to claim 5, wherein the calculating the compensation forces comprises:
  calculating a compensation force in a horizontal direction based on the capture point error; and
  calculating a compensation force in a vertical direction based on the hip height error.

9. The balance control method according to claim 5, further comprising:
  judging the current pose based on the pose angles of the upper body and the angles of the plurality of joint units; and
  setting the set target capture point and the set target hip height based on the current pose and pre-stored motion data.

10. The balance control method according to claim 1, wherein the calculating the target torques comprises:
  calculating distance rates between a point of a COG of the robot projected onto a ground surface and feet respectively connected to the plurality of legs;
  distributing the calculated compensation forces so that the calculated calculation forces are applied to the plurality of legs based on the calculated distance rates; and
  calculating target torques to be applied to the plurality of joint units based on the distributed compensation forces.

11. The balance control method according to claim 5, wherein the acquiring the capture point is carried out using forward kinematics.

12. The balance control method according to claim 1, further comprising:
  calculating pose angle errors by comparing the pose angles of the upper body with set target pose angles;
  calculating compensation moments based on the calculated pose angle errors; and
  reflecting the calculated compensation moments in calculation of the target torques.

13. The balance control method according to claim 12, wherein the reflecting the compensation moments in calculation of the target torques comprises:
  converting the compensation moments into torques of the plurality of joint units using a Jacobian matrix; and
  summing the converted torques and the target torques in calculation of the target torques.

14. The balance control method according to claim 12, wherein the calculating the compensation moments comprises:
  calculating compensation moments in each of yaw, roll, and pitch directions based on the calculated pose angle errors.

15. The balance control method according to claim 1, wherein the detecting the pose angles comprises:
  detecting at least one of a yaw angle, a roll angle, and a pitch angle of the upper body.

16. The balance control method according to claim 1, wherein the calculation of the target torques comprises:
  calculating virtual acceleration of gravity based on the compensation forces, a mass of the robot and acceleration of gravity;
  calculating virtual gravity compensation torque corresponding to the at least one degree of freedom based on the virtual acceleration of gravity; and
  calculating the target torques based on the virtual gravity compensation torque.

17. The balance control method according to claim 1, further comprising:
  setting positions and angles corresponding to remaining degrees of freedom from among the plurality of degrees of freedom;
  calculating a solution of inverse kinematics satisfying the set positions and angles;
  calculating target angles of the plurality of joint units corresponding to the remaining degrees of freedom of the plurality of joint units based on the solution of inverse kinematics; and
  calculating torques of the plurality of joint units corresponding to the remaining degrees of freedom based on the target angles of the plurality of joint units corresponding to the remaining degrees of freedom.

18. The balance control method according to claim 17, wherein the calculating the target torques comprises:
  calculating the target torques by summing the torques corresponding to the at least one degree of freedom and the torques corresponding to the remaining degrees of freedom.

19. The balance control method according to claim 1, further comprising:
  inputting a target angle of at least one joint unit from among the plurality of joint units;
  calculating a torque to track the input target angle of the at least one joint unit; and
  reflecting the torque for tracking the input target angle of the at least one joint unit in the calculating of the target torques.

20. The balance control method according to claim 19, wherein the inputting the target angle comprises inputting target angles of a plurality of joints, when each of the plurality of joint units includes the plurality of joints corresponding to the plurality of degrees of freedom.

21. The balance control method according to claim 1, wherein the calculating the target torques comprises:
calculating the target torques using a Jacobian matrix.

22. The balance control method according to claim 1, wherein the calculating the target torques comprises:
calculating virtual acceleration of gravity based on the compensation forces, a mass of the robot and acceleration of gravity;
calculating virtual gravity compensation torque corresponding to the at least one degree of freedom based on the virtual acceleration of gravity; and
calculating target torques of the plurality of joint units corresponding to the at least one degree of freedom based on the calculated virtual gravity compensation torque and a Jacobian matrix.

23. A balance control apparatus of a robot with a plurality of degrees of freedom, the robot having a plurality of legs and an upper body connected to the plurality of legs, each leg having a plurality of joint units, comprising:
a pose detection unit configured to detect pose angles of the upper body;
an angle detection unit configured to detect angles of the plurality of joint units;
a setup unit configured to set a target pose corresponding to at least one degree of freedom from among the plurality of degrees of freedom based on pre-stored motion data;
a balance controller configured to,
acquire a current pose corresponding to the at least one degree of freedom based on the detected pose angles and the angles of the plurality of joint units,
calculate a pose error by comparing the current pose with the target pose,
calculate compensation forces corresponding to the at least one degree of freedom based on the pose error, and
calculate target torques corresponding to the at least one degree based on the compensation forces; and
a servo controller configured to output the target torques corresponding to the at least one degree of freedom to the plurality of joint units, wherein
the balance controller includes an acquisition unit configured to,
acquire a position and a velocity of a center of gravity (COG) based on the pose angles of the upper body and the angles of the plurality of joint units, and
acquire the current pose by acquiring a current capture point based on the position and the velocity of the COG.

24. The balance control apparatus according to claim 23, wherein the acquisition unit is configured to,
acquire a position of a current reference point of a hip or the upper body of the robot based on the pose angles of the upper body and the angles of the plurality of joint units, and
acquire the current pose based on the position of the current reference point.

25. The balance control apparatus according to claim 23, wherein the setup unit is configured to set a target capture point corresponding to the at least one degree of freedom and set the target pose based on the target capture point.

26. The balance control apparatus according to claim 23, wherein the setup unit is configured to set, a target position of a reference point of a hip or the upper body of the robot corresponding to the at least one degree of freedom, and
the target pose based on the target position of the reference point.

27. The balance control apparatus according to claim 23, further comprising;
a distribution unit configured to,
calculate distance rates between a point of the center of gravity (COG) of the robot projected onto a ground surface and feet connected to the plurality of legs, and
distribute the calculated compensation forces so that the calculated compensation forces are applied to the plurality of legs based on the calculated distance rates, wherein
the balance controller is configured to calculate torques to be applied to the plurality of joint units based on the compensation forces distributed to the plurality of legs.

28. The balance control apparatus according to claim 23, wherein the balance controller is configured to,
calculate pose angle errors by comparing the pose angles of the upper body with set target pose angles,
calculate compensation moments based on the calculated pose angle errors, and
reflect the calculated compensation moments in calculation of the torques.

29. The balance control apparatus according to claim 23, wherein the balance controller is configured to calculate compensation moments in yaw, roll, and pitch directions based on the calculated pose angle errors.

30. The balance control apparatus according to claim 23, further comprising;
an input unit configured to receive motion data including at least one pose from a user, wherein
the setup unit is configured to store the received motion data.

31. The balance control apparatus according to claim 23, wherein the balance controller is configured to calculate,
virtual acceleration of gravity based on the compensation forces, a mass of the robot which is pre-stored, and acceleration of gravity,
virtual gravity compensation torques corresponding to the at least one degree of freedom based on the virtual acceleration of gravity, and
the target torques based on the virtual gravity compensation torques.

32. The balance control apparatus according to claim 23, wherein the balance controller is configured to calculate torques corresponding to remaining degrees of freedom from among the plurality of degrees of freedom using inverse kinematics.

33. The balance control apparatus according to claim 23, wherein the balance controller, when a target angle of at least one joint unit from among the plurality of joint units is input, is configured to,
calculate a torque corresponding to the input target angle, and
reflect the torque corresponding to the target angle of the at least one joint unit in calculation of the target torques.

34. The balance control apparatus according to claim 23, wherein the balance controller is configured to calculate the target torques using a Jacobian matrix.

35. The balance control apparatus according to claim 23, wherein the balance controller is configured to,
acquire current capture point and a current hip height based on the pose angles and the angles of the plurality of joint units, calculate a capture point error by comparing the current capture point with a set target capture point, calculate a hip height error by comparing the current hip height with a set target hip height, calculate compensation forces based on the capture point error and the hip height error, and calculate target torques corresponding to the at least one degree of freedom from among the plurality of degrees of freedom based on the compensation forces.

36. The balance control apparatus according to claim 35, wherein the balance controller comprises:

an acquisition unit configured to, acquire the center of gravity (COG) of the robot and a hip height based on the pose angles of the upper body and the angles of the plurality of joint units, and acquire the current capture point based on the acquired COG.

37. The balance control apparatus according to claim 35, wherein the balance controller is configured to, calculate a compensation force in a horizontal direction based on the capture point error, and calculate a compensation force in a vertical direction based on the hip height error.

38. The balance control apparatus according to claim 35, further comprising:

a force/torque detection unit configured to detect loads respectively applied to feet provided on the plurality of legs, wherein the setup unit is configured to, judge the current pose based on the detected loads respectively applied to the feet, and set the target capture point and the target hip height based on the current pose and the pre-stored motion data.

39. The balance control apparatus according to claim 35, wherein the setup unit is configured to set one point on a line, passing through the inside of a support region formed by feet of the plurality of legs in the direction of gravity, as the target capture point.

* * * * *